(12) United States Patent
Hurley et al.

(10) Patent No.: US 6,678,882 B1
(45) Date of Patent: Jan. 13, 2004

(54) COLLABORATIVE MODEL FOR SOFTWARE SYSTEMS WITH SYNCHRONIZATION SUBMODEL WITH MERGE FEATURE, AUTOMATIC CONFLICT RESOLUTION AND ISOLATION OF POTENTIAL CHANGES FOR REUSE

(75) Inventors: William D. Hurley, Louisville, CO (US); Kyle D. Habermehl, Niwot, CO (US)

(73) Assignee: Qwest Communications International Inc., Denver, CO (US)

( * ) Notice: Subject to any disclaimer, the term of this patent is extended or adjusted under 35 U.S.C. 154(b) by 0 days.

(21) Appl. No.: 09/345,044

(22) Filed: Jun. 30, 1999

(51) Int. Cl.$^7$ ................................................. G06F 9/44
(52) U.S. Cl. ........................ 717/121; 717/122; 709/316
(58) Field of Search ................................ 717/121, 122; 709/316

(56) References Cited

U.S. PATENT DOCUMENTS

| | | | |
|---|---|---|---|
| 5,574,898 A | * 11/1996 | Leblang et al. | 707/1 |
| 5,649,200 A | * 7/1997 | Leblang et al. | 395/703 |
| 6,061,692 A | * 5/2000 | Thomas et al. | 707/200 |
| 6,272,672 B1 | * 8/2001 | Conway | 717/107 |
| 6,314,555 B1 | * 11/2001 | Ndumu et al. | 717/101 |
| 6,332,163 B1 | * 12/2001 | Bowman-Amuah | 709/231 |
| 6,442,547 B1 | * 8/2002 | Bowman-Amuah | 707/10 |
| 6,442,748 B1 | * 8/2002 | Bowman-Amuah | 717/108 |
| 6,556,659 B1 | * 4/2003 | Bowman-Amuah | 379/9.04 |

OTHER PUBLICATIONS

IBM Component Broker on System/390, Alex Gregor et al, IBM, Nov. 1998, pp. 1–93, 205–229.*

Client/Server Programming with JAVA and CORBA Second Edition, Robert Orfali et al, published Jan. 30, 1997, pp. 1–60, 331–371, 433–483, 711–783, 905–932.*

OMG, "Business Object Architecture (BOA)," Object Management Group, Proposal BODTF–RFP 1 Submission, Nov. 9, 1997; pp. 39–42.

O. Sims, Business Objects: Delivering Cooperative Objects for Client Server; London, McGraw–Hill, 1994; pp. 128, 134–135, and 154–165.

R. Orfali, D. Harkey, and J. Edwards, The Essential Distributed Objects Servival Guide; New York, John Wiley & Sons, 1996; pp. 329–335.

R. Orfali, D. Harkey, and J. Edwards, "The Essential Client/Server Survival Guide", Second ed. New York; John Wiley & Sons, 1996; pp. 246–248.

J. Almarode and R. Breti, "Reduced–Conflict Objects" in Journal of Object–Oriented Programming, vol. 10, No. 8, (Jan.); pp. 40–44, 1998.

J. P. Munson and P. Dewan, "Sync: A Java Framework for Mobile Collaborative Applications", IEEE Computer, vol. 30, No. 6 (Jun.); pp. 59–66, 1997.

E. Gamma, R. Helm, R. Johnson, and J. Vlissides, "Design Patterns: Elements of Reusable Object–Oriented Software", Reading, MA: Addison–Wesley Publishing Company, 1995; pp. 4–6 and pp. 26–28.

* cited by examiner

Primary Examiner—Todd Ingberg
(74) Attorney, Agent, or Firm—Brooks Kushman P.C.

(57) ABSTRACT

A collaboration model is provided for constructing evolutionary collaborative applications deployed in network environments, such as the World Wide Web, or wireless environments, which supports introduction of new object types into the deployed system. The collaboration model is arranged as a set of submodels. The highest-level control resides in a synchronization submodel. A merge submodel defines mechanisms for merging changes, detecting conflicts, and resolving conflicts whenever possible. A change submodel is operative to define allowable changes for shared objects. A replication model is arranged to provide replication functionality, and define how multiple versions of an object are presented. A distribution submodel provides distribution functionality, and a type submodel provides a programming language-independent representational scheme for the overall collaboration model. The synchronization submodel, the merge submodel, and the replication submodel are arranged to use constructs defined by the change submodel.

25 Claims, 6 Drawing Sheets

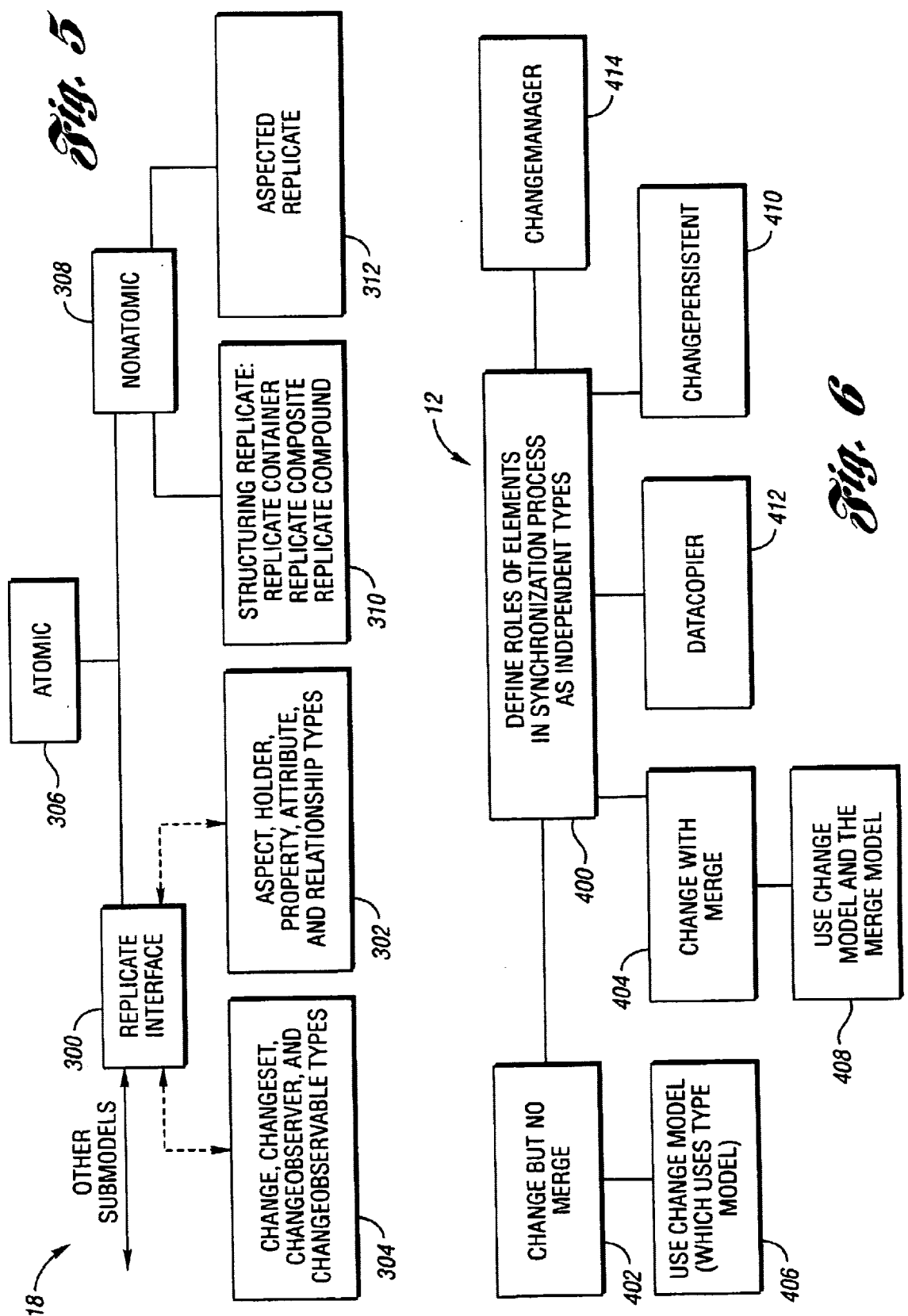

COLLABORATIVE MODEL FOR SOFTWARE SYSTEMS WITH SYNCHRONIZATION SUBMODEL WITH MERGE FEATURE, AUTOMATIC CONFLICT RESOLUTION AND ISOLATION OF POTENTIAL CHANGES FOR REUSE

TECHNICAL FIELD

The present invention relates generally to collaborative applications, and more particularly to a collaboration model which can support the introduction of new object types into deployed network environments.

BACKGROUND ART

When a software system is to support an organization of software elements and humans working together, system designers must be concerned with certain community acts. The least complex of these acts is known as coordination, i.e., the act of harmonizing the performance of activities that may or may not have a common purpose such as the avoidance of resource conflicts. This harmonizing introduces the basic notions of concurrent systems, such as mutual exclusion, deadlock, and starvation. The act of working together toward a common purpose or end is known as cooperation, and typically involves coordination plus a synchronization of efforts. For example, the ordering of events among objects in order to achieve a certain goal requires an agreement among them to transmit signals indicating when certain events have taken place.

The most complex of the community acts is known as collaboration. This involves cooperation on a common effort requiring intelligence, defined here as the ability to acquire knowledge through experience, i.e., to learn, and to apply that knowledge. Arguably, both humans and software have the potential to exhibit intelligence.

A collaborative system is a software system that allows multiple agents to collaborate and communicate by sharing objects. An agent is a human or a software element possessing some degree of intelligence. Examples of software agents are software systems external to the collaborative system and workflow processes such as automated business processes within the collaborative system.

An object is a unit of software that often, but not always, corresponds to something in a real-world problem domain. People who extensively use direct-manipulation graphical user interfaces generally tend to blur the distinction between a software object, its graphical manifestation in a user interface, and its real-world referent. When viewed as software units, the shared objects referred to above with respect to a collaborative system may range in complexity from relatively simple passive objects that exhibit only reactive control (e.g, data objects that are stored in data bases), to active objects capable of proactive control and which can initiate interactions with other objects, to autonomous objects that exhibit intelligence by adapting their control mechanisms and behavior. Popular buzzwords for autonomous objects include "agent" and "business object."

A collaborative system provides object sharing, replication, and distribution; change detection and notification; change collection and reporting; change merging with conflict identification and resolution whenever possible; and propagation of changes and unresolved conflicts to agents. The key issue to be addressed in the design of a collaborative system is providing the collaborating agents with appropriate (not necessarily consistent) views of what is going on in the most efficient way for a particular collaborative situation. Before designing a collaborative system, designers must consider the range of collaborative situations the system is required to handle, and the constraints imposed by development and deployment environments.

Collaborative situations can be distinguished by sometimes-independent features. An example of one such situation is when each agent works with a local copy of an original object that is persistent on some central server. Here, there is no sharing among agents, but synchronization of the local copies with the persistent, original object will be required eventually. Another situation is when each agent works on objects that are independent of objects worked on by other agents. Here, the object sharing supports only inter-agent communication, e.g., to inform what each agent is doing. In yet another example, multiple agents work on the same objects or on objects that are interdependent. Here, object sharing supports not only inter-agent communication but also cooperation. Other situations are as follows: agents are working at different times; agents are working at the same time, but at locations that prohibit communication; agents are working at the same time and in locations that support real or near-real time communication; explicit rules exist for resolving conflicting changes so that resolution of conflicting changes (made by one or more agents) can be automated; only implicit rules exist for resolving conflicts so that conflict resolution cannot be automated; whether the agent population includes both humans and software elements; and the importance of protecting information and restricting access to it.

As an example of a collaborative situation, consider the following. Certain employees of a telecommunications service provider, each with a different role (set of responsibilities), collectively satisfy a customer service order, such as for two phone lines to a residence. Here, object sharing supports inter-agent communication and cooperation. Agents work independently (asynchronously) on some tasks and in concert (synchronously) on others. Some conflict resolution can be automated, while other conflict resolution requires human intervention. The agents include humans and software. Different agents have different access to information based on laws, regulations, agent role, and business considerations.

A number of considerations impact the design of the software to be developed and deployed. Such considerations include the number of developers (vendors) involved. The larger the number, the greater the need for an open architecture and a high degree of programming-language independence. Another consideration is the number of external systems with which the proposed system must interact. This consideration has the same consequences as the number of developers. Yet another consideration is the expected lifespan, which is influenced by economics and technology. To have a life that is both long and successful, a software system must have high evolvability. Further examples include whether it is reasonable for mobile agents to perform their work by using the collaborative system while physically connected to a central server, and the constraints imposed on the choice of client software for mobile and stationary agents. For example, are agents constrained to using only thin clients, like Web browsers.

Open architecture, programming-language independence, and evolvability are critical. Systems with open architectures provide well-defined interfaces that facilitate extension by (metaphorically) plugging in a new software component or swapping one software component for another. Such systems also promote the use of frameworks that allow systems to be configured by assembling and parameterizing components (modern techniques for configuring systems dynamically, i.e., at runtime).

Programming-language independence means that software elements will be able to work together independent of the programming language in which they were written. It allows different vendors to work in different programming languages. By definition, it means that developers can work and think closer to a conceptual level of the application problem and further away from the coding level of the programmed solution. Evolvability encompasses open architectures and programming-language independence and is discussed in more detail below.

For mobile agents, situations sometimes make it difficult or impossible to work while connected (wired or wireless) by mobile devices such as notebook computers. The application requires rapid response but the connections are slow or unreliable. The application is used in locations where physical connection is impossible. In such situations, the objects to be shared must be distributed, i.e., downloaded to the mobile devices.

In contrast, stationary agents usually access shared objects that reside on a central server. The current trend in industry is away from fat clients running on relatively powerful desktop computers and toward thin clients, such as Web browsers, running on relatively low-capability network computers or even lower-capability network appliances.

Thus, to have a life that is both long and successful, a software system must have high evolvability, which is defined as dynamic programmability in combination with dynamic maintainability. Dynamic means at runtime, while the system is operating.

Technology, regulations, and business organizations are continually changing, introducing new or modified products and services and new business practices. In some highly-competitive industries, such as telecommunications, many systems are considered mission-critical, even those that interact with customers over the Web. In order for companies to avoid the high and potentially disastrous costs of system obsolescence and down-time, the systems they deploy must be dynamically maintainable, i.e., they must have the capability to dynamically adapt, grow, and be updated or transitioned to new uses. Thus the individual operations that can be performed on a dynamically maintainable system are the same operations that can be performed on a system that is statically maintainable, except that they can be applied not only at design time but also at runtime. Some of these operations involve introducing new software components, including components that were not thought of when the system was originally deployed.

Open architectures facilitate introducing new software components, whether at design time or at runtime. However, runtime introduction also requires dynamic programmability. Dynamic programmability is the ability to perform operations on a binary executable runtime component that are traditionally performed on source code. Some of these operations include the following: to modify a component; to deliver to a site and to construct, new (to the site) implementations, such as class hierarchies in an object-oriented implementation; to register newly arrived or created components; to discover the protocols and services of components; and to negotiate a set of interactions with a component. By implication, dynamic programmability encompasses programming language independence.

As the state of the art moves closer to evolvable systems, the partitioning of responsibilities among roles such as developer, operator, administrator, maintainer, and end-user becomes more difficult. In this description, the term user refers ambiguously to all five roles.

As a result, collaborative systems can be quite complex. Building complex systems of quality, on-time, and within cost, is impossible without first describing the systems using models. Modeling raises the problem to an abstract level for resolution with minimal resources. A solution defined at an abstract level can then be translated to a concrete level as an implemented system.

As a result, a need exists for a model that can support the construction of collaborative systems that support a range of collaborative situations, and which can be developed by multiple vendors, have a long lifespan, and be deployed in a variety of environments, including wired and wireless networks.

Developers construct software systems with the goal of satisfying specific requirements, i.e., of providing certain capabilities and of meeting certain conditions, constraints, and expectations. Some kinds of requirements, such as expectations and certain performance requirements can be represented only in prose, which is inherently imprecise and ambiguous, e.g., the expectation "The user interface must be easy to use." Other kinds of requirements can be represented as formalized specifications, or concrete models, of the system to be built. These concrete models are precise and analytic to the degree of formalization of the notations, or abstract models, from which they are produced.

A collaboration model is an abstract model. In order to support construction of collaborative systems, a collaboration model must provide abstractions that support precise, analytic representations of collaborative application domains, as well as promote the specification of efficient designs in network environments for a range of collaborative situations. In addition, collaborative models must support the specification of designs with open architectures, dynamic programmability, and dynamic maintainability.

A collaboration model must be able to describe three categories of requirements: functional requirements, design requirements, and requirements for achieving evolvability. Note that while the purpose of these sections is to enumerate what a collaboration model must be capable of describing at design time, they also suggest what a collaborative system must be capable of performing at runtime.

Functional requirements concern what must be implemented in a collaborative system in order to solve the application problem. They describe the elements of an application problem domain, their structure and interrelationships, and their patterns of communication, behavior, and control. A collaboration model must have abstractions capable of describing the following:

objects of arbitrary complexity;
collaboration functionality (replication, distribution, cooperation, and synchronization of results) that can be applied at any arbitrary degree of granularity, from coarse-grained to extremely fine-grained, e.g., from the coarse grain of a complete diagram to the fine-grain of a single arrowhead on a directed line within a diagram;
replication of shared objects;
distribution of shared objects;
object sharing by multiple agents (humans, software elements, work processes);
communication patterns (inform, order events, asynchronous, synchronous);
work patterns (independently, in concert);

cooperation among work activities whether performed independently or in concert;

synchronization of work results to achieve system (enterprise) goals;

change detection and notification;

change collection and reporting;

change merging with conflict identification and resolution;

propagation of changes and unresolved conflicts synchronization that is automated and uses machine intelligence whenever possible; and separation of factors that determine access to shared objects, such as role, security, and so forth.

Development requirements concern how a collaborative system will be developed in order to improve the lot of the developers. A collaboration model must have abstractions capable of describing the following:

participation of a shared object in any agent activity, such as a workflow process, independently of its participation in any other agent activity, or workflow process;

separate treatment of roles and security as factors affecting access to shared objects;

location transparency: agents and high-level system software elements are unaware of the physical location of shared objects, e.g., on central servers or distributed across clients;

uniform treatment of agents, whether human or software (facilitates replacing humans by software as technology advances and software systems become more powerful);

open architectures that promote the use of frameworks; and programming-language independence.

These development requirements promote or are direct prerequisites for evolvability.

Evolvability requirements concern systems that can adapt, grow, and be updated or transitioned to new uses at runtime. A collaboration model must have abstractions capable of describing the following:

each of the operations that collectively make up dynamic programmability, discussed earlier; and each of the capabilities that collectively provide dynamic maintainability, discussed earlier.

For collaborative systems, one critical issue relates to handling conflicts that arise from multiple concurrent access to resources. Principles of software design for concurrent solutions dictate that conflicts be considered at the highest level of abstraction possible—at the conceptual level if possible. The most primitive mechanism for synchronizing concurrent access to shared objects is known as a "lock." Locks constrain low-level (relative to the conceptual level of the application problem) concurrency semantics to provide brute force conflict-prevention.

To overcome the deficiencies of lock mechanisms, some efforts have defined conflict-reduction mechanisms. Compared to locks, these mechanisms manifest higher-order concurrency semantics such as distinguishing commutative and non-commutative sequences of operations. For example, in an article entitled "Reduced-conflict objects," *Journal of Object-Oriented Programming*, vol. 10, no. 8 (January 1998), pp. 40–44, J. Almarode and R. Breti have defined reduced-conflict counters, bags, dictionaries, and so forth. However, because of their low-level of abstraction, conflict-prevention and conflict-reduction mechanisms are inadequate for complex collaborative systems. These systems need high-level conflict-detection and conflict-resolution mechanisms that can work in concert with sophisticated replication and distribution mechanisms. Conflict must be addressed at the system level.

In an article entitled "Sync: A Java Framework For Mobile Collaborative Applications," *IEEE Computer*, vol. 30, no. 6 (June 1997), pp. 59–66, J. Munson and P. Dewan provide a comparison of several collaborative systems which is summarized as follows. Lotus Notes provides replication and synchronization mechanisms with automatic, fine-grained change detection and synchronization, but supports only a relatively narrow range of object structures. Carnegie Mellon's Coda provides coarse-grained replication at the file level (i.e., a file is required to represent each object), and then transports objects across the network as individual files. Such a system is necessarily cumbersome to program because it requires each replicated object to be independent, which objects generally are not. Xerox's Bayou uses a tuple-store data model, which is inherently mismatched with modern object-oriented applications. In addition, several of theses systems (e.g., MIT's Rover, Carnegie Mellon's Coda, and Xerox's Bayou) handle conflict detection on an update-by-update basis, which can result in inconsistencies unless all updates are mutually independent, which is unlikely in the general case.

Sync overcomes many of the weaknesses of these systems by supporting fine-grained change detection, and synchronization and replicated shared objects of arbitrarily complex structure. However, Sync suffers from a number of deficiencies such as the change notification mechanism is based on the model-view-controller (MVC) microarchitecture. Mechanisms based on MVC have the following disadvantages: they require considerable programming effort to use because MVC is so generic; they are hard to maintain over time because notification kinds are distinguished by textual labels; they have considerable runtime overhead because all notifications are sent to all dependents; they are inefficient when changes are fine-grained or indirect change propagation is involved. For example, a situation that illustrates all of these weaknesses is when an attribute of one object may be affected by changes in an attribute of another object. In this situation, one object must register interest with another object. When the attribute changes, the change notification must be propagated from the attribute (or operation affecting the attribute) to the object containing the attribute and then to all the dependent objects. A dependent object containing the attribute that is interested in the change must then invoke an operation that appropriately affects the interested attribute.

In addition, Sync does not explicitly support multiple views on and protected access to shared objects. Further, although Sync defines separate models for replication and change, the models are language-dependent (Java). Because the replication constructs are implemented directly as classes in a static language (Java), support for dynamic maintainability and dynamic programmability is severely weakened.

As noted previously the use of frameworks are to be promoted. A framework is a reusable implementation arranged to make it easier, quicker, and cheaper to develop software within a family of applications having similar features. At the macro (or system) level of granularity, a framework provides all the support needed to build, run, and maintain a system. A framework should free the developer from concerns about control (e.g., program structure, control flow, and calls to system-level APIs). The developer informs the framework which situations the developer's code will handle and provides the code to handle them. When these situations occur at runtime, the framework invokes the programmer's code. The programmer's code does not call the framework.

There are two broad categories of frameworks. White-box frameworks use language-dependent features, in particular class inheritance and dynamic binding, which allow application developers to customize and extend a framework through subclassing or template parameterization. White-box frameworks require application developers to be somewhat intimate with the code, e.g., they must consider control issues. In contrast to white-box frameworks, black-box frameworks use language-independent mechanisms having component technology which uses object composition and delegation. This technology allows developers to customize and extend frameworks by inserting new components into a framework that has a plug-and-play interface. While providing superior advantage in use, the black-box frameworks are harder to develop because the plug-and-play interfaces (called hot-spots in the framework literature) must be designed to support the widest feasible range of possible uses.

As a result of the above, a need exists for a model for collaborative applications that can meet the above-noted requirements while overcoming the limitations of known arrangements.

DISCLOSURE OF INVENTION

It is therefore an object of the present invention to provide a collaboration model for collaborative applications which overcomes the above-described limitations in available programming while satisfying the enumerated design requirements.

It is another object of the present invention to provide a collaboration model which can support long-life collaborative applications in network environments such as the World Wide Web or wireless networks.

It is a further object of the present invention to provide a collaboration model suitable for evolutionary collaborative applications which can support introduction of new object types in deployed systems.

In accordance with these and other objects, the present invention provides a collaboration model for supporting construction of distributed systems and a range of collaborative situations having a type submodel arranged to isolate all other submodels from any external programming system by defining types as well as types of types, a change submodel responsive only to type submodel constructs and arranged to define a manner in which types and instances are allowed to change, and a programming language independent replication submodel arranged to define a manner in which multiple versions of objects are represented. A synchronization submodel is arranged to collect and report changes in isolation of potential changes, while a merge submodel is arranged to initiate collection of changes, identify conflicts, resolve conflicts, and propagate notification of whether changes were accepted, rejected, or a conflict could not be resolved. A distribution submodel is arranged to define a manner in which objects are physically transported across a system.

The collaboration model of the present invention provides several advantages. For example, change detection and notification hide programming details, represents events of interest as objects, allows selective notification, and promotes efficiency even for indirect, fine-grained changes. The present invention also provides separate treatment of factors that determine access to shared objects and location transparency of shared objects that not only makes programming easier, but also supports a range of deployment strategies. The present invention provides a more efficient distribution of shared objects when objects are related to other objects, and avoids the overhead, i.e., the inclusion of code which consumes memory and execution time, associated with replication functionality when situations do not call for replication. Situations that do call for replication include any situation involving distribution of shared objects or any situation involving complex collaboration with no distribution of (i.e., locally-maintained) shared objects. Still further, the present invention incurs the overhead associated with merge functionality only when situations call for merging. Situations that do call for merging include any situation that involves conflict detection and resolution. The present invention also avoids the overhead associated with distributed object functionality when situations do not call for distribution of shared objects. This benefit derives from the observation that multiple versions of a shared object may exist on a central server. In addition, open architectures are supported that not only promote the use of frameworks, but also explicitly treat potential variations (hot spots) and reuse contracts (framework technologies that have been insufficiently exploited). Finally, programming language independence and high evolvability are provided, along with a model architecture having a high degree of modularity achieved through decomposition into submodels that have strong internal cohesion and weak external coupling.

The above objects and other objects, features, and advantages of the present invention are readily apparent from the following detailed description of the best mode for carrying out the invention when taken in connection with the accompanying drawings.

BRIEF DESCRIPTION OF DRAWINGS

FIG. 5 is a block diagram showing the constructs of the replication submodel;

FIG. 6 is a block diagram showing the constructs of the synchronization submodel;

BEST MODE FOR CARRYING OUT THE INVENTION

Figure 1:
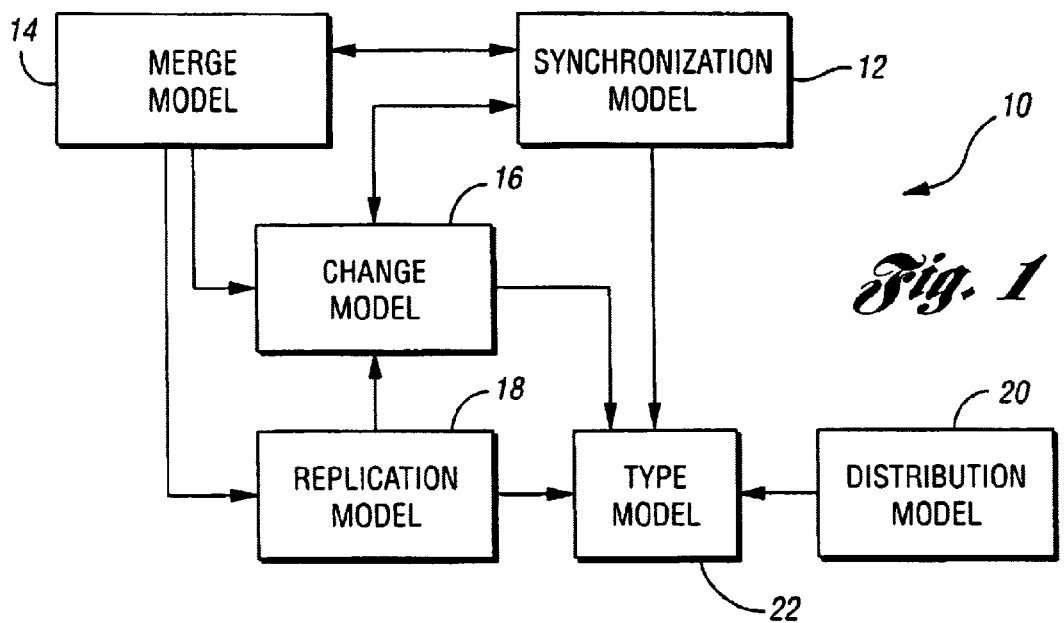
FIG. 1 is a block diagram illustrating the submodels of the collaboration model of the present invention and associated interrelationships.

As shown in FIG. 1, the present invention provides a collaboration model 10 which breaks down the overall model into inter-related submodels. FIG. 1 shows the submodels of the collaboration model and the dependency, or use, relationships among them. It is to be understood that while each submodel may be referred to throughout the description as a "model," each operates as submodel within the context of the overall collaboration model of the present invention. The highest-level control resides in a synchronization model 12. This model is responsible for collecting and reporting changes, and propagating changes and unresolved conflicts. A merge model 14 defines mechanisms for merging changes, detecting conflicts, and resolving conflicts whenever possible. A change model 16 is operative to define allowable changes for shared objects. A replication model 18 provides replication functionality, and defines how multiple versions of an object are represented, and a distribution model 20 provides distribution functionality. A type model 22 provides a programming language-independent representational scheme for the overall collaboration model. The type model is operative to provide the basis for dynamic maintainability and dynamic programmability. The change model forms the "heart" of the collaboration model, while the synchronization model, the merge model, and the replication model all use the change model constructs.

As further described below, the replication model is programming language independent. The change and synchronization models are very weakly coupled to the replication model, which allows developers to avoid the overhead of replication functionality when this function is not needed. In addition, the collaboration model explicitly partitions versioning and distribution functionality into replication model 18 and distribution model 20. Thus, the overhead of distributed component functionality is incurred only when a situation calls for distribution of shared objects.

Collaboration model 10 of the present invention is an abstract model, which is represented using an abstract specification language to attain the benefits of both formalization and programming-language independence. In software engineering, a key concern when using any specification language is disciplined use. The prescription of discipline is called a method, which is by definition a process for generating models (an abstract specification of something is a model of it). Typically, a method follows an overall strategy, includes a notation (the specification language), and provides guidelines for using the notation.

The abstract specification language used in the present invention is based on the software engineering concept of "types." In the context of software engineering, type theory is well-understood. The use of types for abstract specifications provides a number of important advantages. For example, the only limitations on representational scope are those imposed by the predefined types, which can be extremely generic. Because they are implementation-independent, the use of types allows developers to focus on high-level system design issues. Developers are logically freed from downstream concerns such as persistence, "garbage" collection, polymorphism, and late binding. A similar benefit applies to object modeling when compared to object programming as described below.

Types define the public (reuse) contracts for instances of that type. If implemented as constructs in themselves, they provide the basis for reflection, i.e., self-representation that allows examination, which is a prerequisite for dynamic programmability and dynamic maintainability. Types can be extended in disciplined ways, and with some attention to naming conventions, produce specifications that are relatively easy to understand. Types can also be used to specify interfaces for plug-and-play assembly and parameterization of reusable components. Thus they support the development of sophisticated frameworks. In addition, types are an effective way to define roles, which serve a number of useful purposes. The formalness of specifications based on types strongly supports the development of highly reusable components.

The strategy that governs the method for creating the collaboration model of the present invention primarily concerns the use of types. The strategy employs two varieties of types: "interface types" specify only behavior and apply to roles, while "abstract types" specify both behavior and structure, and are used to specify abstract constructions (highly reusable component designs). A traditional view of object-oriented applications uses responsibilities (a role corresponds to a set of responsibilities) to drive the design of objects. From a more modern view of component-based systems, types are used to define the roles of components such as business objects. In accordance with one aspect of the present invention, the strategy is not applied at the level of deliverables such as an application or collaborating components, but at the level of the infrastructure in which deliverables are constructed and in which they operate/ execute. More specifically, types are used to define the roles of the collaboration mechanisms themselves. In particular, types are used to define interfaces and abstract types aimed at supporting the development of frameworks for collaborative systems.

In addition to accounting for the use of types to generate abstract specifications, i.e., an abstract model or a less-abstract concrete model of a system to be built, the strategy must also at least consider how abstract specifications would translate into implementations. The mapping from a type-based specification/design to a class-based implementation is facilitated by languages that explicitly distinguish and account for interfaces and classes implementations. One suitable language is Java. In Java, interface types would map to Java Interfaces, while abstract types would map to abstract Java Classes.

As noted above, interface types specify only behavior and apply to roles. A role defines a particular view of a thing in a particular situation. It defines what a thing is for (its responsibilities or the services it provides) as opposed to what the thing is. Multiple elements could assume the same role at the same time, or in a significantly more complex situation, an element could assume varying combinations of multiple concurrent roles. An example showing the use of roles, such as when a company is temporarily both a customer and a supplier, is described in an article "Business Object Architecture (BOA)," Object Management Group, Proposal BODTF-RFP 1 Submission, Nov. 12, 1997, pages 39–42.

For complex situations, when class-based languages are used for implementation, a disciplined approach to handling roles becomes very important. Without a disciplined approach, the permutations of possibilities becomes unmanageable. With a disciplined approach, even ordinary object-oriented systems can implement such complex situations.

Interface types can be used at the specification and design levels of abstraction to handle complex situations, including those in which objects take on varying combinations of multiple concurrent roles at runtime. Roles can be defined with a technique called dynamic subtyping. Dynamic subtyping can be implemented using a delegation-based technique known as dynamic superclassing. Using types to define roles is also a disciplined way to specify/design plug-and-play interfaces. First, roles are identified to account for the potentially variable aspects of systems or components. As a simple example, a Web-based system could vary by storage, presentation, and navigation. These three design dimensions would be represented using the roles Loader, Editor, and Resolver, respectively.

Second, roles are elaborated to define their responsibilities. Each role defines a set of responsibilities that coherently represents a particular concern, e.g., the Loader provides storage. As definitions of sets of responsibilities, roles establish reuse contracts for elements that handle the particular concern. As parties to the contract, the elements have a great deal of freedom, as long as the contract remains satisfied. This elaboration may result in the identification of other roles used to provide finer-grained separation of concerns. For example, to provide storage, a Loader may need to provide a Registry, which keeps track of what elements are stored, and a Persistence service to provide a storage mechanism (e.g., relational database, object storage engine, or cache file).

Third, types are used to specify the roles and their responsibilities as interfaces that provide a limited protocol. Each type defines a plug-and-play interface (or hot-spot) that allows construction and configuration by assembly and parameterization of software elements that satisfy the contracts.

Because each type formally defines only a limited protocol that minimally satisfies a reuse contract, it supports information hiding, or encapsulation, which in turn promotes security and safety. When an element is plugged into a hot spot, it is known only as an instance of the type that satisfies the reuse contract with a specific protocol. Suppose a software element is given access to the plugged-in target element. The software element only sees a restricted view of the target element as an element that satisfies the reuse contract by implementing the specific protocol defined by the hot-spot type. Any other functionality the plugged-in element may implement is hidden from the accessing software element. In this example, an accessing element interacting with a target element playing the role of Loader sees the target element only as a Loader, regardless of any additional functionality it may have.

As indicated above, abstract types specify both behavior and structure. They correspond to highly reusable component designs. Abstract types can be introduced in different logical stages of development for complementary purposes. In analysis, they are used to provide generalizations that raise the level of abstraction and thereby promote reusability. They define abstract classes independent of programming language. In software design, abstract types further enhance reusability of implemented code. Here, they specify abstract classes for a particular programming language. In object-oriented programming, an abstract class is a class that may not have any instances, regardless of whether it fully implements its defined behavior. A class that does not fully implement its defined behavior is sometimes called a deferred class.

Typically, a set of abstract classes in a framework provide the core functionality of the framework design and implement the interconnections among its structures. These abstract classes establish the basic control rules governing how objects in the framework work together. The framework allows developers to customize or to extend a framework by plugging into the framework objects of concrete subclasses, which have been packaged with the framework or added to it, respectively. Concrete subclasses handle situations related to a runtime environment, an application domain, or a specific application.

The elements of notation used in the present invention are well-known in the art. The behaviors of types, both interface types and abstract types, are specified using signatures, pre and post-conditions, and invariants.

A signature has the following general form:
<return type>methodName(<parameter list>).
Each signature is a minimal specification of an operation. Although signatures alone are sufficient to support tools capable of some verification, a more complete specification of a method includes pre and post-conditions and invariants.

The structure of abstract types is specified using the notation of Object Modeling Technique (OMT), generation 2. In addition, context-free grammars such as the Backus-Naur Form (BNF) notation, have been found useful during development of some models, such as the Change Model.

State transition diagrams and Petri nets are used for abstract specification of control, sequential and concurrent, respectively. These are used sparingly, and with caution, to avoid over-specification, which unduly constrains developers concerned with language-dependent design and implementation.

Guidelines for specification and guidelines for abstract model architecture (at the macro and micro-levels) derive from various sources. The guidelines were organized by assigning priority to the those that have a long history of demonstrated success when applied to industrial-strength systems.

Description of each model will now be made in conjunction with FIGS. 2–9.

Figure 3:
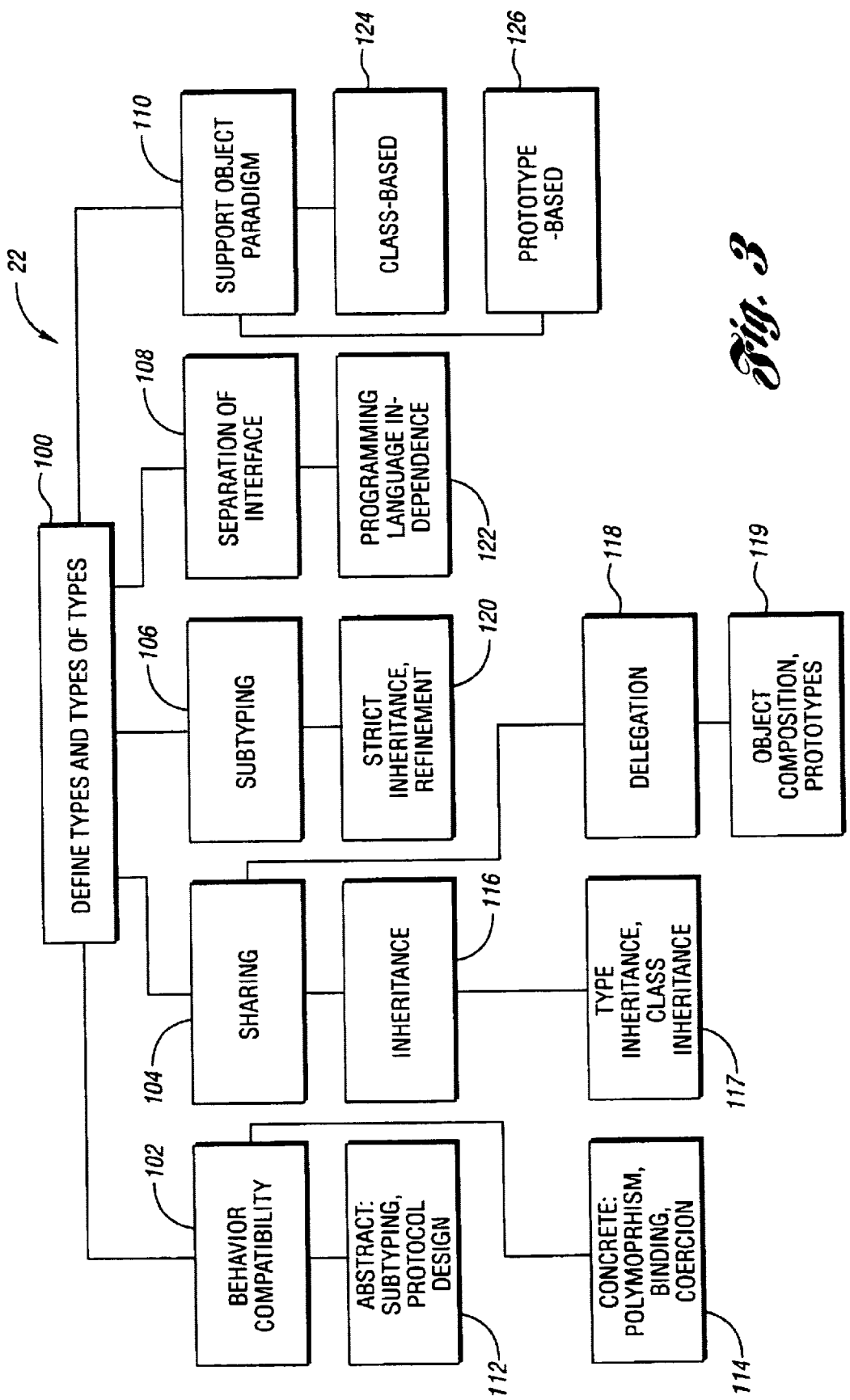
FIG. 3 is a block diagram showing the constructs of the type submodel.

Type model 22 provides a representational foundation for the collaboration model, and is shown in greater detail in FIG. 3. It underpins all the other submodels, isolating them from any programming system. As indicated at block 100, the type model defines not only types but also types of types (metatypes, or type definitions), thereby providing strong support for dynamic programmability and dynamic maintainability. The type model provides extremely fine-grained representation, with explicit constructs more fine-grained than those accessible at the programming interface of most high level programming languages such as Java, and support for arbitrarily complex software structures.

Types are used to provide precise definitions (specifications) of the elements (abstractions) of the collaboration model (an abstract model) and their organization. A type is a precise characterization of the properties which a collection of things all share. The properties may be structural, e.g., attributes and structuring relationships, or behavioral, e.g., operations. The term type is sometimes used ambiguously to refer to a template (a blueprint for generating instances of the type), a classification (categorization of instances that have the same implementation), or a set (of instances generated from the same template or of the same kind). In object-oriented programming languages, this definition of type can be applied to the programming construct class.

As described more fully below, the use of types in the present invention focuses on behavioral compatibility 102, sharing 104, subtyping 106, separation of interface and implementation 108, and support for object paradigms 110. Other concerns include protocol design and consideration of certain downstream, implementation techniques.

Behavioral compatibility between a type A and B exists where instances of type B may be used in all the places in which instances of type A can be used. Behavioral compatibility can be achieved at block 112 in the abstract (design) by subtyping and protocol design, and in the concrete (implementation) at block 114 by polymorphism, late binding, and coercion. Because the type model of the present invention supports system design and not implementation, it supports the abstract techniques and leaves the concrete techniques for the implementers. The concrete techniques are described here only for completeness.

With respect to sharing, two fundamentally different phenomena for sharing behaviors have a major impact on the design and implementation of software systems. The first is denoted at block 116 as "inheritance," which is the transmission or passing on of properties (including operations) among types. The other is denoted at block 118 as "delegation," which is the passing on of responsibility for an operation from one instance to another instance. Development methods and programming languages manifest inheritance and delegation by defining a variety of mechanisms. Inheritance mechanisms include type inheritance and class inheritance as denoted at block 117. Delegation mechanisms include object composition and prototypes as denoted at block 119.

Subtyping block 106 is generating a new type from an existing type through strict inheritance and refinement. The types are organized into type structures that reflect strict, possibly multiple inheritance of properties and refinement. Multiple inheritance occurs when a child type has more than one parent type. Strict inheritance, sometimes called monotonic inheritance, means that a child type cannot cancel, or selectively inherit, properties from any of its parent types.

Refinement of a child type, as indicated at block 120, may involve the following: (1) adding a property to the type, (2) adding a facet to an inherited property, or (3) modifying an inherited facet of an inherited property. Refinement is allowed only in ways that keep the child type behaviorally compatible with each of its parent types. That is, instances of the child type may be used in all the places where instances of each of its parent types can be used. Thus, refinement does not allow specialization in the sense of introducing additional detail into or further constraining a child type in a way that makes it no longer behaviorally compatible with a parent type. An example of incorrect subtyping would be further constraining of the range of legal values of a given property. Subtyping has an even narrower interpretation when considering only interfaces.

For certain situations, in particular distributed systems, separation of interface and implementation is critical. For example, consider a distributed application based on business objects. Two business objects such as trouble reports might look the same (i.e., same interface) even though they were implemented differently by two different company units or two different vendors, possibly in two different programming languages. Certain standards for distributed systems depend on this separation of interface and implementation. In addition, some programming languages explicitly support this separation while others do not. For example, Java provides support with distinct language constructs Class and Interface, while C++ uses only a single construct, Class, to specify both implementation and interface. As indicated at block 122, the designed system must provide the separation independent of the programming language.

For purposes of understanding the present invention, the term "type" refers to interfaces and "subtyping" refers to interface inheritance. Here, a type categorizes instances that share the same interface. The discussion on Object Paradigms considers the terms that refer to implementation.

In software development, the activity which first considers which domain concepts will be implemented in software is called analysis. This activity is followed (logically, not necessarily temporally) by design (architecting a software solution) and then by implementation (writing code). Two fundamental variations of the object paradigm are used for analysis, design, and implementation. These variations are sometimes distinguished by their sharing mechanisms. The first is denoted at block 124 as class-based paradigm which uses inheritance among classes (as templates), and the second is denoted at block 126 as prototype-based paradigm which uses delegation among instances. This distinction is somewhat naive because objects (instances of classes in the class-based paradigm) do use delegation when they are structured as compositions, while prototypes can be structured into inheritance structures.

The type model of the present invention supports both variations of the object paradigm, as well as the prototype-based variation to implement the class-based variation, with considerable advantage. The type model provides this support in two ways: (1) using traditional approaches, developers can integrate types, classes, and prototypes within the same inheritance structures, and (2) using emerging approaches that provide evolvability, types can be used to define programming constructs that implement the class-based paradigm and the prototype-based paradigm. In (2), evolvability is enhanced because the types provide meta-interfaces through which the programming constructs can be modified at runtime.

Protocol design applies to types or classes not related by inheritance. The goal is to achieve protocol compatibility, which implies behavioral compatibility. In general, the protocol of a type is the set of communications, e.g., directed messages, multicast event notifications, broadcast signals, to which instances of that type will respond. In this model, the protocol of a type is the set of operation signatures, where a signature includes the operation name, a sequence of typed parameters, and a type of result. If the protocol of type B includes the protocol of type A, then type B is protocol-compatible with type A, and therefore type B is behaviorally compatible with type A.

Implementation techniques include polymorphism, late binding, and coercion. At the programming language level, achieving protocol compatibility through protocol design and maintaining protocol compatibility despite refinement of inherited operations are made possible by polymorphism. In general, polymorphism is the ability of instances of different types to respond differently to the same communication based on their type. In the type model, polymorphism is the ability of an operation to take different forms (e.g., algorithms used within the operation) depending upon the type of the instance performing it. Here, two operations are polymorphic if they have same signature, i.e., the same name, the same sequence of typed parameters, and the same type of result.

Late binding is a set of programming language features that allows a programmer to defer commitments for as long as possible. The possible features are automatic storage management, dynamic typing of variables, and three degrees of dynamic binding of procedures. Different programming languages offer different combinations of late binding features.

The third way to achieve behavioral compatibility is coercion. More specifically, it is possible at the programming language level to coerce behavioral compatibility. One way is to derive a new replacement for an original object through modification of an otherwise incompatible object. An example of such a modification is hiding additional parameters on certain interactions. In this way, an interaction of the new replacement object can be made to look like an interaction of the original object.

As noted above, the present invention provides certain benefits by representing types in computer-based, tool-manipulable form. A description is now made regarding aspects of the type model related to such explicit representation.

A type definition (or meta-type) defines a kind of type. Different kinds of types have different kinds of type definitions. A set of meta-types constitutes a meta-model, while a set of types constitutes a model. Meta-types and types are specifications of the structure and behavior of things. Things that support a particular type or meta-type are obligated to implement the specification and to support its semantics. The things that support meta-types are types, while the things that support types are called instances, to distinguish them from types.

Many object-oriented systems use a recursive definition of concepts unified around a central concept. Everything is an object, including classes, and sometimes meta-classes. Similarly, the type model uses a recursive definition of concepts unified around the central concept of type. Everything is a type, including meta-types.

Because the type model deals with specification and not implementation, it contains meta-types and types, but no instances of types. However, it must have a syntactic way of distinguishing, in a specification, a reference to a type from a reference to an instance of a type; for example, whether a property is instance-valued or type-valued. In a concrete model, this distinction corresponds to an object of a class or a class, respectively.

In addition, the type model supports genericity, i.e., a parameterized type facility. Parameteric types specify how implementations can be constructed. For example, a Container may contain elements of any type(s). This can be further constrained by defining a subtype of Container that may contain elements of only a specified type or a set of types.

The type model defines operations on types. These operations can be used to change, and to record changes on, the individual types of a model. Because meta-types are types, these same operations can be used to modify the type model itself. This is the ultimate form of evolvability. For example, operations support adding, removing, or modifying the properties of a type, which in object-oriented systems, corresponds to adding, removing or modifying the fields of objects (of a class). These operations are prohibited in languages and systems that support only static maintainability, e.g., class-based languages with static typing. They are allowed in languages and systems that support dynamic maintainability, e.g., prototype-based languages with dynamic or no typing.

This explicitly exposed nature of the type model (reflection and open implementation) provides strong support for any runtime systems that need to log changes made to instances or to types at runtime. For example, information in the types that describe operations and operation signatures could be accessed at runtime so that a log entry of the invocation of an operation could record the parameter types, the argument instances, or both.

A description will now be made regarding the basic constructs used to generate a type model that manifests the type theory and supports computer-based, tool-manipulable representations in accordance with the present invention. The first construct are referred to as elementary constructs. Elementary category of constructs is those constructs that the type model provides to manifest the essential type theory. These representations are probably most easily thought of as of the frame-slot variety. The type Type represents a type in the theory. The type Property represents a property in the theory. A Property contains at least two constructs: an identifier (an Aspect) for the Property that is unique within the scope of the Type and a value (a Holder).

An Aspect is an immutable elemental construct that plays the role of a Property identifier, i.e., it is used to identify a Property by name or by number. In a concrete model, or an implementation, an Aspect could be either an IntegerAspect (value is an integer) or a StringAspect (value is a string). A Holder is an elemental construct that plays the role of a Property value, i.e., it is used to hold the value of a Property. The value could be structural, such as an instance of a data type or an object, or it could be behavioral, e.g., an operation.

Another category of constructs is referred to as modeling constructs. Modeling constructs are those constructs that the type model provides to support modeling. Here, there is a similarity to the constructs in object-oriented modeling. One such construct is attribute. Conceptually, an attribute is data type-valued and describes some aspect of the internal structure of an element. From the perspective of the attributed element, the value of the attribute has no unique identity. The value of the attribute has no existence independent of the attributed element. If the attributed element goes away, the value goes away also. For example, the individual Person 'Henry H. Yrneh" is age 35. The attribute 'age' has a value of 35. From Henry's perspective, the 35 has no unique identity, it is simply his age. If Henry is removed from the scope of our concern, so is the value 35. In notations such as OMT or UML, an attribute is modeled as a prose string of the form <attribute name>:<data type> listed in the class box. In the type model, an Attribute is a Property. In the Henry example, the Aspect of the Attribute has a value 'age' and the Holder has a value 35.

Another modeling construct is relationship. Conceptually, a relationship is a connection or association involving types or instances. Relationships among instances involve either structure or interaction. Structuring relationships include awareness, ownership, attachment, spatial inclusion, meronymic (whole-part) inclusion, and so forth. Interaction relationships include transfer of material, transmission of energy, and communication of data. Relationships among types usually establish inheritance structures. For distributed systems, the treatment of relationships is critical to achieving loosely-coupled collaborative components, such as business objects.

In the entity-relationship paradigm, relationships are bidirectional between entities. For example, the relationship between Company and Employee is a 1:N relationship. In the object-oriented paradigm, the focus is on directed relationships and encapsulation of information within objects. A directed relationship allows traversal from the source participants (types or instances) to the target participants (types or instances). A company object would have a employees field pointing to a collection of employees, while each employee object would have a worksfor field pointing to the company for which the employee worked. In graphical notations, such as OMT or UML, relationships are modeled as lines joining classes, with special symbols to denote multiplicity and to distinguish certain kinds of relationships, such as aggregation, and text labels to further clarify their semantics.

In the type model, relationships are directed. In contrast to the data elements of an attribute, the target elements of a relationship have unique identities from the perspective of the source element, and their existence is inherently independent of the existence of the source element. For example, Henry has a supervisor (say Susan). If Henry is removed from the scope of our concern (say he dies of old age), Susan continues to exist. Of course, some relationships are defined so that if the source element goes away, so also do any target elements, e.g., a jar filled with marbles gets incinerated.

In the type model, a taxonomy of RelationshipType distinguishes the semantics of relationships of each type. For example a RelationshipType distinguishes whether the source participant and the target participants are types or instances, the allowable range of cardinality of the source and target participants, and certain other semantic properties specific to the type of relationship. A RelationshipType also includes information about its inverse, if any. It can be shown that the information stored in RelationshipType(s) and RelationshipProperty(s) is sufficient to generate graphical notations in both the object-oriented and entity-relationship paradigms.

The participation of a type or instance as a source of a directed relationship is modeled as a relationship, which is a Property of the source type that identifies its Relationship-Type and specifies any semantics that may be more specific than (but must be consistent with) the semantics defined in the RelationshipType, including information about its inverse, if any. This technique supports not only traditional implementations of runtime objects and databases but also implementations that treat relationships as first-class objects.

Atomic Types are not decomposable, primitive (represents a data type native to most programming systems), and inherently immutable. That is, an atomic type has no (visible) internal structure. Primitives include integer, float, boolean, character, string, and null. An inherently immutable object remains immutable from the time it is created until it is destroyed. In contrast to atomic types, non-atomic types have (visible/accessible) internal structure. Non-atomic types include Structuring and Aspected. Structuring types participate in relationship(s) only as targets. Aspected types participate in relationship(s) as targets and as sources. Aspected types provide the constructions necessary for specifying arbitrarily complex structures.

Structuring types define elements that may have unique identity and that do have internal structure. More specifically, Container and its subtypes define the most basic structures, corresponding to the traditional data structures defined in discrete mathematics, which include collection, set, bag, ordered collection, sorted collection, sequence, sequence-set, array, stack, queue, dictionary, and so forth. A Container may contain elements of any type. Container types look like abstract data structures, that is, their internal structure is implicitly defined by he semantics of their access operations.

Container(s) may be used as the values of Holder(s). If a Container-valued Holder is part of an attribute, then the Container contains data-level elements and the Container is simply a data structure. In contrast, if a Container-valued Holder is part of a (directed) relationship, which is a Property of the source type of the relationship, then the Container contains domain-level target elements of the relationship, and the Container itself implicitly manifests (according to the operations of its type) a specific kind of non-functional meronymic relationship.

In contrast to Container, which allows sharing of parts (an element may belong to multiple Container(s)), a Composite explicitly precludes sharing of parts. A Composite has a tree structure (or hierarchy) of parts. When a component is added to one Composite, that component is removed automatically from any other Composite of which it is a component. Of course, the same object can be both a Composite and a component of a Composite. Like Container types, Composite defines internal structure implicitly, through the semantics of the access operations. The Composite type defines the operations with which a Composite can add, remove, and get components, and mechanisms by which a composite can propagate other operations to its components. The composite is also a design pattern.

In contrast to a Composite, which is strictly tree-structured, a Compound may have an arbitrarily complex internal structure. A Compound may interact with its components in specific ways and the components may interact with each other. Of course, the same element can be both a Compound and a component of a Compound. Different subtypes of Compound are characterized by their structure and the rules that govern their behavior. For example, in the CORBA specification, each compound has a directory-like structure with named components. The compound will distribute events to its components, but will never manipulate the data in them. Components communicate only via the compound, and components cannot affect their compound. Some compound elements and their components come into existence and expire together. The internal structure of a Compound can be made explicit by using relationship(s), or made implicit by the semantics of its operations. Note that while the internal structure of a Compound may be arbitrarily complex, this internal structure is encapsulated within the Compound object itself.

Aspected types may participate in relationship(s) not only as targets but also as sources. Thus, they provide suitable constructions for describing arbitrarily complex structures that are not necessarily encapsulated within any element. Encapsulation would depend on the semantics of the relationship. An Aspected type contains a set of Property(s), which may be attribute(s) or relationship(s). The relationship(s) allow participation as the source of structuring relationships, which can be used to connect elements into structures ranging from simple associations to structures of arbitrary complexity. Examples of such structures include the object models found in any text on object-oriented analysis or design. The type Aspected defines operations for accessing Property(s). For example, one could retrieve an enumeration of Aspect or of Property, add a Property, remove a Property corresponding to a specified Aspect, retrieve the Property that corresponds to a given Aspect, and so forth.

A specialized structure is a non-encapsulated (i.e., not a Compound) structure of specific elements types connected in specific ways by specific relationship types. In software engineering, these structures are intended to provide a highly reusable solution to a recurring problem. Although a specialized structure is not uniquely identifiable, because it is not encapsulated, the elements of a specialized structure might be created and destroyed together, which is accomplished by propagating operations along relationships. Specialized structures include design patterns and N-ads. For example, perhaps the most widely known N-ad is a model-view-controller (MVC) triad. A model object captures application data, a view object is a graphical user interface (GUI) presentation of the application data, and a controller object is a mechanism for handling user input and other GUI events.

The type model supports evolvability by providing representations that support the following features:
  programming language independence, i.e., isolation from any base programming language or system;
  constructs for defining a range of abstraction-oriented languages, including class-based and prototype-based, or languages that combine the two;
  reification (making information explicit, as runtime elements);
  reflection (self-representation that allows examination), both structural (how something is implemented), and behavioral (what happens at runtime);
  open implementation (interfaces for making changes);

factory methods for runtime configuration; and registration and notification mechanisms (for occurrences of interest).

As discussed above, the change model is the "heart" of the collaboration model. The synchronization model, merge model, and replication model use its constructs as shown in FIG. 1. The constructs of the change model do the following: define the ways in which types and instances can change; provide the capability to express arbitrarily fine-grained changes, direct or indirect, within arbitrarily complex structures; and establish the basis for change detection and notification.

Figure 4:
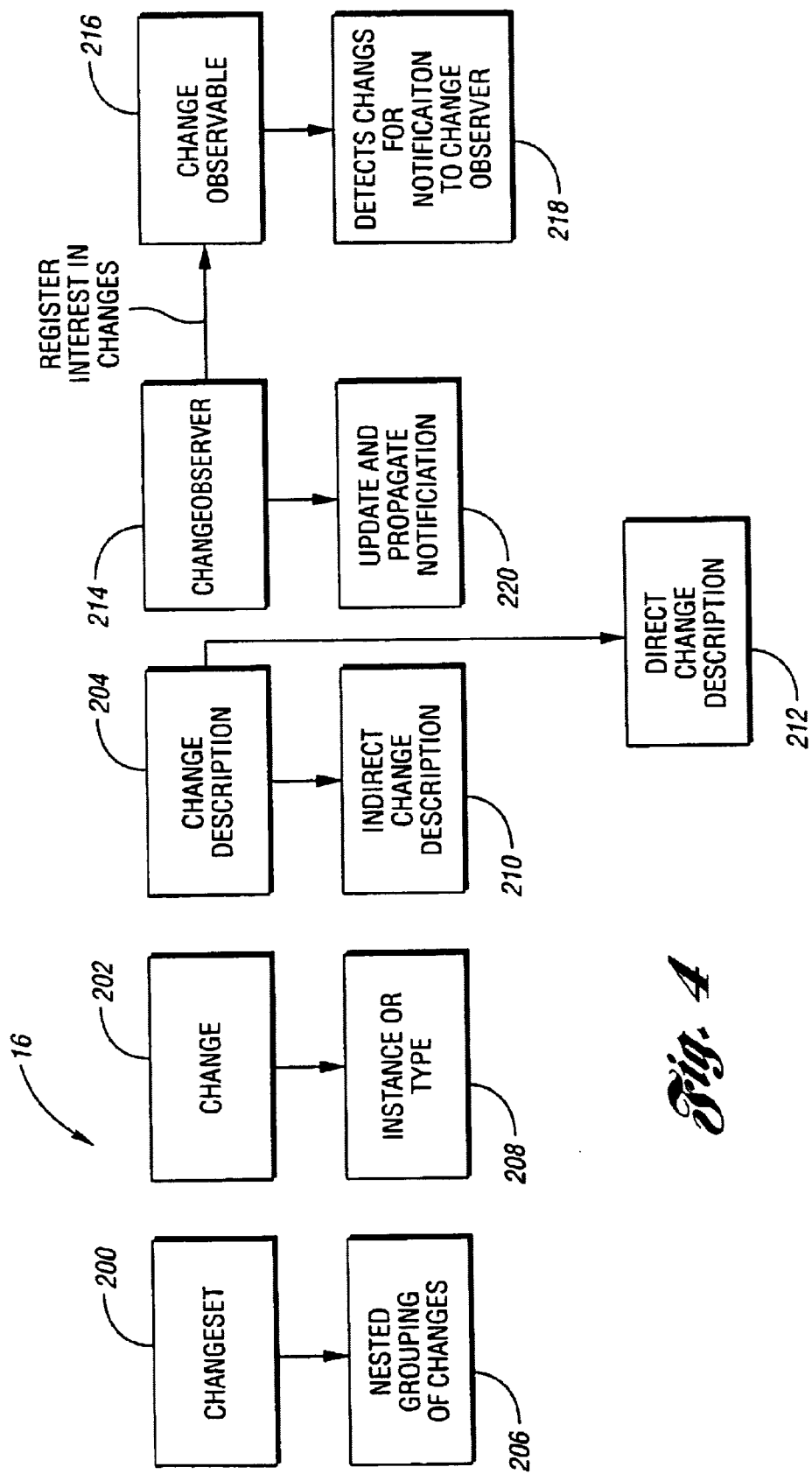
FIG. 4 is a block diagram showing the constructs of the change submodel.

In accordance with the present invention, change model 16 is shown in greater detail in FIG. 4, and is arranged to use constructs of only the type model and not of any other submodel. Thus, the change model inherits all the benefits of the type model while avoiding the overhead of functionality defined in the other submodels. The change model is also arranged to define changes not only to instances but also to types. Thus, the change model supports evolvability. The change model also defines changes in terms of the operations that produce the changes, and it does so in a way that accommodates operations that have not yet been defined. Still further, the change model can hide programming details, represent events of interest as objects, allow selective notification, and promote efficiency even for indirect, fine-grained changes. The manner in which the change model provides these functions is described more fully below.

Change occurrences involving a given thing (an instance or a type) may be direct or indirect. A direct change occurs when a given thing is operated on, i.e., performs an operation that changes it in some way. An indirect change occurs to a given thing when some other thing to which the given thing is related changes. It is a change because the future behavior of the given thing may now be altered, depending on the nature of the relationship. It is indirect because the given thing itself is unchanged. The change that occurred in the related thing could be direct or indirect with respect to the related thing itself.

An example of a direct change is illustrated when an automated teller machine (ATM) issues cash, and its cash on hand is thereby reduced. An example of an indirect change is illustrated when a central computer to which an ATM is connected goes down. The ATM cannot communicate with the central computer while it is down, so the ATM cannot verify a bank card because verification information is maintained on the central computer. However, the ATM itself is unchanged. Suppose the central computer did not go down, but could not provide verification because the information was maintained on some other computer and that other computer went down. In this case, there are two indirect changes, i.e., the ATM has in indirect change because the central computer has an indirect change.

The change model defines constructs (types) that can be used to record and to explicitly distinguish direct and indirect changes. The change model allows the abstract notion of a change occurrence to be treated independently of what information is needed to describe the nature of the occurrence. Specifically, change occurrences are treated by two types: ChangeSet as denoted at block 200, and Change as denoted at block 202, while the descriptions of occurrences are treated by three ChangeDescription types as denoted at block 204.

More specifically, as indicated at block 206, a ChangeSet describes a possibly nested grouping of changes. A ChangeSet consists of a set of elements, each of which may be a ChangeSet or a Change. ChangeSet supports transaction semantics. A ChangeSet can be marked whether it is transactional. A transactional ChangeSet is atomic with respect to accepting or rejecting changes. If any one Change or ChangeSet within a transactional ChangeSet is rejected, then every Change and ChangeSet within it will be rejected and it will be rejected.

A Change describes a change occurrence, which, whether direct or indirect, is ultimately the responsibility of some change Agent (human or software). The "object" of the change is an instance or a type as shown at block 208. The description of the change occurrence is contained in a ChangeDescription.

A ChangeDescription provides any information about a change occurrence which is type-specific with respect to the object of the Change. A ChangeDescription is to be implemented as an abstract class (can have no instances) that defines the common protocol for describing the ways in which the object of a Change may be changed. The protocol itself is independent of the nature of the change (e.g., direct or indirect) and of the nature of the object changed. A ChangeDescription specifies the scope of a change as an aspect of the object of the Change, unless the change applies to the entire object, e.g., a creation or deletion. For a direct change, the scope of the change is confined to the Property itself. For an indirect change, the scope of the change is some object that the Property references.

Two subtypes of ChangeDescription account for and distinguish indirect and direct changes. The first is an IndirectChangeDescription 210 which elaborates the description of the scope of a change occurrence by identifying which object within the Holder (the value) of the identified Property is the object that changed. Consider these examples: If the value (contents of the Holder in the identified Property) is an indexed collection, the position is indicated by an index. If the value is a dictionary, the position is indicated by a key. The type of the container, if any, in the value of the Holder is determined by accessing (querying) the identified Property. An IndirectChangeDescription includes a Change, which provides information about the change made to the object identified as described immediately above. The representation of indirect changes is recursive, and supports any arbitrary degree of indirection down to the ultimate direct change: a Change contains an IndirectChangeDescription contains a Change contains an IndirectChangeDescription . . . contains a Change contains a DirectChangeDescription. The other subtype of ChangeDescription is DirectChangeDescription 212 which identifies the operation that was performed on the object of a Change, and it specifies a Time at which the change was recorded.

Types ChangeObserver 214 and ChangeObservable 216 support change detection and notification. They define the protocols for elements that can register interest in changes and can report changes, respectively. A change could be an individual Change or a ChangeSet. These two types are based on the Observer design pattern with extensions that support both direct and indirect change detection and notification, and that support efficient detection and notification for fine-grained changes. A ChangeObserver registers directly with a ChangeObservable. The ChangeObserver can register for any change in the ChangeObservable or for only changes in specific Aspect(s) of the ChangeObservable.

This Aspect-level registration improves efficiency over dependencybased mechanisms, such as MVC, in which an observer can register only a general interest in any change, receives all change notifications, and must filter out those in which it is not interested. As denoted at block 218, a ChangeObservable handles each detected indirect or self-initiated direct change by notifying only those ChangeObservers that have registered for the kind of change. As denoted at block 220, a ChangeObserver reacts to a notification of change possibly by updating itself in some way, and if it is also a ChangeObservable, by further propagating notification of a detected indirect change. In a given system, the degree of granularity at which changes can be detected and propagated depends on the level of granularity of the constructs declared as ChangeObserver or ChangeObservable. This treatment of granularity is discussed further in connection with the replication model.

For certain situations, additional semantics must be added to the change model. For a creation operation, the object of the Change and the result returned by the operation are the same object. For a deletion operation, the object of the Change might not have actually been deleted from a system. It might continue to exist until the Change is accepted, propagated, and invoked. An implementation would provide the disambiguating semantics. A DirectChangeDescription specifies a Time at which the change was recorded. The implementation determines the reference from which time is measured. Also for a DirectChangeDescription, and as noted in the discussion of the type model, at runtime, a description of the operation performed could include, in addition to its signature, the actual arguments bound to the parameters when the operation was invoked and the results returned by the operation.

Replication model 18 of the present invention is shown in greater detail in FIG. 5, and is arranged to define how multiple versions of objects are represented. Thus it has the potential to constrain the granularity with which changes could be represented. The types of the replication model are based on types defined in the type model, which yields not only the benefits inherent in the type model but also the following benefits: a shared common underlying representation with the change model, which enhances compatibility with that model; a granularity for representing changes that is the same as that specified in the change model; and operations for producing all the possible changes specified in the change model. The replication model does not include any distribution functionality, the overhead of which is incurred only when a situation calls for distribution of shared objects. The replication model is also programming-language independent and supports evolvability.

More specifically, the bridge between the replication model and other submodels is type Replicate, which is introduced first, followed by the other major types of the replication model, organized by functionality. As indicated at block 302, the replication model uses types defined in the type model, including Aspect, Holder, Property, Attribute, and Relationship. It also uses types defined in the change model, including Change, ChangeSet, ChangeObserver and ChangeObservable as shown at block 304.

As indicated at block 300, the type Replicate defines an interface common to all replicates (replicated objects). This interface includes those operations invoked by the merge model as shown in FIG. 1. A Replicate is created as a copy or reproduction of some other object. As indicated at block 306, some Replicate types are atomic (immutable and not decomposable). A non-atomic Replicate type may be declared immutable at block 308 in order to control the granularity of change merging. Recursive merge (conflict resolution) algorithms stop recursing when they reach an immutable Replicate. Any Replicate may participate as a target of a structuring relationship.

A ReplicateProperty is a Replicate and a Property (multiple inheritance) that contains at least two constructs: an identifier (an Aspect) and a value (a ReplicateHolder). A ReplicateHolder is a Holder whose held value is a Replicate. A ReplicateProperty may be a ChangeObserver and a ChangeObservable. A ReplicateProperty might register as a ChangeObserver with any ChangeObservable Replicate(s) in its ReplicateHolder or with certain ChangeObservable ReplicateProperty(s) of those Replicate(s). As a ChangeObservable, a ReplicateProperty reports to its ChangeObserver(s) the following: (1) any changes it makes to its value (ReplicateHolder), and (2) any changes reported by any of the ChangeObservable(s) with which it has registered as a ChangeObserver. In case (1), the ReplicateProperty creates Changes and/or ChangeSets. In case (2), it repackages the Change or ChangeSet it receives from a ChangeObservable.

In addition, a ReplicateAttribute is a ReplicateProperty and an Attribute whose value is a Replicate data type, while a ReplicateRelationship is a ReplicateProperty and a Relationship whose source and target participants are Replicate (s).

Atomicity types in the replication model correspond to the atomic and non-atomic categorizations in the type model. For example, an AtomicReplicate and its subtypes are the replication model equivalents of Atomic and its subtypes in the type model. An AtomicReplicate is not decomposable and is inherently immutable, i.e., it is immutable from the time it is created and initialized (assigned a value) until it is destroyed. A NonAtomicReplicate is a Replicate that is not atomic. It is a unique version of a specific original source, and may be declared immutable. NonAtomicReplicate defines operations that express intentions to commit or rollback any changes made to the element since its last commit or rollback. The operations express an intention because it is the merge agent, defined in the merge model, that determines what changes ultimately are committed and to what state a Replicate is rolled back.

Operations for supporting change management include those for change detection and notification, which are inherited from ChangeObservable and ChangeObserver. Other change management operations include reporting recorded changes upon request, receiving notification that specified changes were rejected during the merge process, updating self in accordance with a specified Change or ChangeSet, and clearing all recorded changes. Depending on the implementation, a NonAtomicReplicate that has been declared immutable may ignore or raise an exception if certain change management operations are invoked.

NonAtomicReplicate subtypes include StructuringReplicate 310 and AspectedReplicate 312. A StructuringReplicate 310 and its subtypes are the replication model equivalents of Structuring and its subtypes in the type model. Subtypes include ReplicateContainer, ReplicateComposite, and ReplicateCompound. Each StructuringReplicate type inherits operations from type NonAtomicReplicate and defines access operations appropriate to its particular internal structure. The internal structure of a StructuringReplicate consists of Replicate(s). As a ChangeObserver, a StructuringReplicate can be notified of changes to any of the Replicate (s) in its internal structure. As a ChangeObservable, a StructuringReplicate can send notifications of indirect changes (changes reported by elements of its internal structure) and direct changes (changes to its internal structure), as defined by the change model.

An AspectedReplicate is an Aspected (type model) and a Replicate. Because it is Aspected, it can support replication of both fine-grained and arbitrarily complex structures. An AspectedReplicate contains a set of ReplicateProperty(s), which may be ReplicateAttribute(s) or ReplicateRelationship(s). AspectedReplicate defines operations for modifying and extracting data in ways that are consistent with the change model. As a ChangeObserver, an AspectedReplicate can be notified of changes by any ChangeObservable Replicate(s), including ReplicateProperty(s) and NonAtomicReplicate(s). This of course, includes Replicate(s) to which it is associated, and the associations could be internal or external, to any level of structural nesting. As a ChangeObservable, an AspectedReplicate can send notifications of indirect changes (changes reported by ChangeObservable(s) to which it is associated) and direct changes (changes it performs), as defined by the change model. An AspectedReplicate would send change notifications to its registered ChangeObserver(s), which may include other AspectedReplicate(s) or ReplicateHolder(s).

Synchronization model 12 of the present invention is shown in greater detail in FIG. 6, and is arranged to define mechanisms for collecting and reporting changes, and propagating changes and unresolved conflicts. Together with the merge model, it provides powerful, efficient coordination from both the system (software) and the agent (collaborator) perspectives. The synchronization model is based on the change model and the type model. This basis permits fine-grained synchronization of work results within arbitrarily complex structures. The synchronization model is carefully isolated from potential changes in the replication model, which more than with any other model, may be influenced by the programming language or system selected. The synchronization model also optimizes software reuse across three very different situations: (1) those involving changes but no merging (no automated conflict detection and resolution), (2) those involving changes and merging, (3) those involving replication, which inherently also involve merging.

The synchronization model achieves isolation from potential changes in the replication model as indicated at block 400 by defining the roles of elements in the synchronization process as types that are independent of their representations as replicated objects. Only the merge model is concerned with these representations.

The optimization of software reuse is accomplished in the following ways: (1) types are used to define roles that distinguish the responsibilities of corresponding elements in each situation, the types are generalized and the more generalized a type (a role) is, the more situations it is used in, (2) the synchronization model invokes functionality of other models only as necessary to a situation, and (3) the traditional treatment of persistent elements is elaborated in a way that takes advantage of the change model as a common language for expressing change.

Controlling the use of functionality concerns avoiding the use (and thereby incurring the overhead of additional code) of functionality except in situations where it is necessary. Opportunities for controlling the use of functionality include situations in which replication functionality, merge functionality, and distribution functionality are avoidable.

Situations in which replication functionality is avoidable (introduced earlier) can be divided into two kinds: situations involving changes but no merging (no automated conflict detection and resolution required) as denoted at block 402, and situations involving changes and merging as denoted at block 404. For both kinds, replication can be replaced by copying. The type model defines copy functionality. For the first kind of situation, the synchronization model uses the change model (block 406), which uses the type model. No merging is required, so synchronization can be achieved by conflict-prevention mechanisms, possibly augmented with conflict-reduction mechanisms, and by operations for maintaining consistency between activated objects (copies) and their persistent representations in secondary storage.

For the second kind of situation in which replication functionality is avoidable, the synchronization model uses the change model and the merge model at block 408. Here, the merge model uses the change model and not the replication model. Changes are made (synchronously or asynchronously) to copies, the changes are eventually merged, and accepted changes, rejected changes, and unresolved conflicts are propagated. Thus, replication functionality is avoided.

Situations that require replication functionality inherently also require merging, but not vice versa. In these situations, constructs from the type model are transformed into constructs of the replication model, and the more complex versioning functionality of the replication model is used instead of the simpler copying functionality of the type model.

Distributed object functionality can be used or ignored, as the situation calls for, by including or omitting the distribution model, respectively. This is possible because the distribution model provides distributed object functionality transparently (to the developer). In FIG. 1, the distribution model is shown isolated from the other submodels, with the exception of the type model, which it uses to determine how to package objects for physical transport across networks. Another way to visualize the architecture is that, only when necessary to support distribution of shared objects, the other submodels are placed on top of the distribution model, which transparently provides distribution functionality. A fuller explanation is provided below.

Persistence (of an element) is existence over time independent of the existence of the process in which it was created and independent of the life of the process in which it may currently be active. The major issue with persistent objects is maintaining consistency between the state of an active element relative to the state of its representation in persistent storage. In traditional treatments of persistence, the following operations affect state consistency: commit, rollback, and update. The commit operation explicitly saves the current state of the active object to persistent storage and releases any locks currently held on the active object. The rollback operation explicitly discards any changes in the current state of the active object that were made since the last commit or rollback, and releases any locks currently held on the active object. The update operation notifies the persistence service that a persistent attribute of the persistent element has changed. Typically, the persistence service either does an auto-commit or identifies the persistent element as having changed since last it was saved to persistent storage.

A situation without replication reflects the traditional treatment of persistent objects elaborated to make use of the change model as the language for expressing changes. The relevant types are ChangePersistent 410, DataCopier 412, and ChangeManager 414.

More specifically, the type ChangePersistent 410 uses the change model as the language for expressing change in such a way that the type satisfies the responsibilities of two roles: the role of an active element that has a persistent representation and the role of a mechanism that is responsible for maintaining consistency between active copies and their persistent representations. The justification for this dual-role capability is the fact that in the change model, the representation for ChangeSets and Changes identifies both the object of the change and the agent of the change. The agent of any change is always required in order to verify access permission for security. The object of the change is redundant when the changes are reported by the changed object, but this redundancy (whose implementation requires only a simple pointer or identifier) is a small price to pay for model (architectural) simplicity.

Both roles of a ChangePersistent object are defined in a way that is independent of the service or mechanism (database, storage engine, or cache file) by which the active element achieves its persistence. ChangePersistent defines operations for commiting a specified ChangeSet containing changes made since the last commit or rollback, rolling back a specified ChangeSet containing changes made since the last commit or rollback, and updating based on a specified ChangeSet containing changes made since the last commit or rollback. The semantics of the operations is consistent with the semantics of operations in the traditional treatment of persistent objects, discussed above.

Replication involves multiple (possibly distributed) versions replicates) of original source elements. Data must be copied into replicates when they are created and whenever they are updated. Thus, copying data into a replicated object efficiently becomes an issue. Data-copying behavior includes two techniques: refresh and update. These two techniques provide users (clients) with a consistent view of the original source data across replicates. Refresh replaces the entire replicate with data from the source. It works well when moving small amounts of data with low volatility, and for doing initial bulk loads of the replicate. Update sends only the changed data to the replicate. Updates can be synchronous, i.e., the replicate is updated in the same commit scope as the source, or they can be asynchronous, which means that the replicate is updated in a separate transaction than the one updating the source. Asynchronous updates are more flexible because the degree of synchronization to be maintained between the source and replicate and the interval of updates can both be specified. Thus, the level of data obsolescence to be tolerated is controllable.

The type DataCopier 412 uses types defined in change model and other types defined in the synchronization model to define the role of an instrument for refreshing or updating elements to be consistent with a specified Subject (original source in the synchronization model) or ChangeSet (in the change model).

For merging, managing change information becomes an issue. Change management operations include reporting changes, which involves maintaining (recording) changes that were self-generated or collected from elsewhere; dissemination of notifications that certain changes, reported earlier, have been rejected during the merge process; dissemination of notifications of unresolved (change) conflicts; and clearing any recorded changes that are being maintained for possible future reporting. The above operations always occur within some controlled scope of responsibility.

The type ChangeManager 414 defines the role that corresponds to a logical scope of responsibility for managing change information. It defines the protocol for the operations described above.

Figure 2:
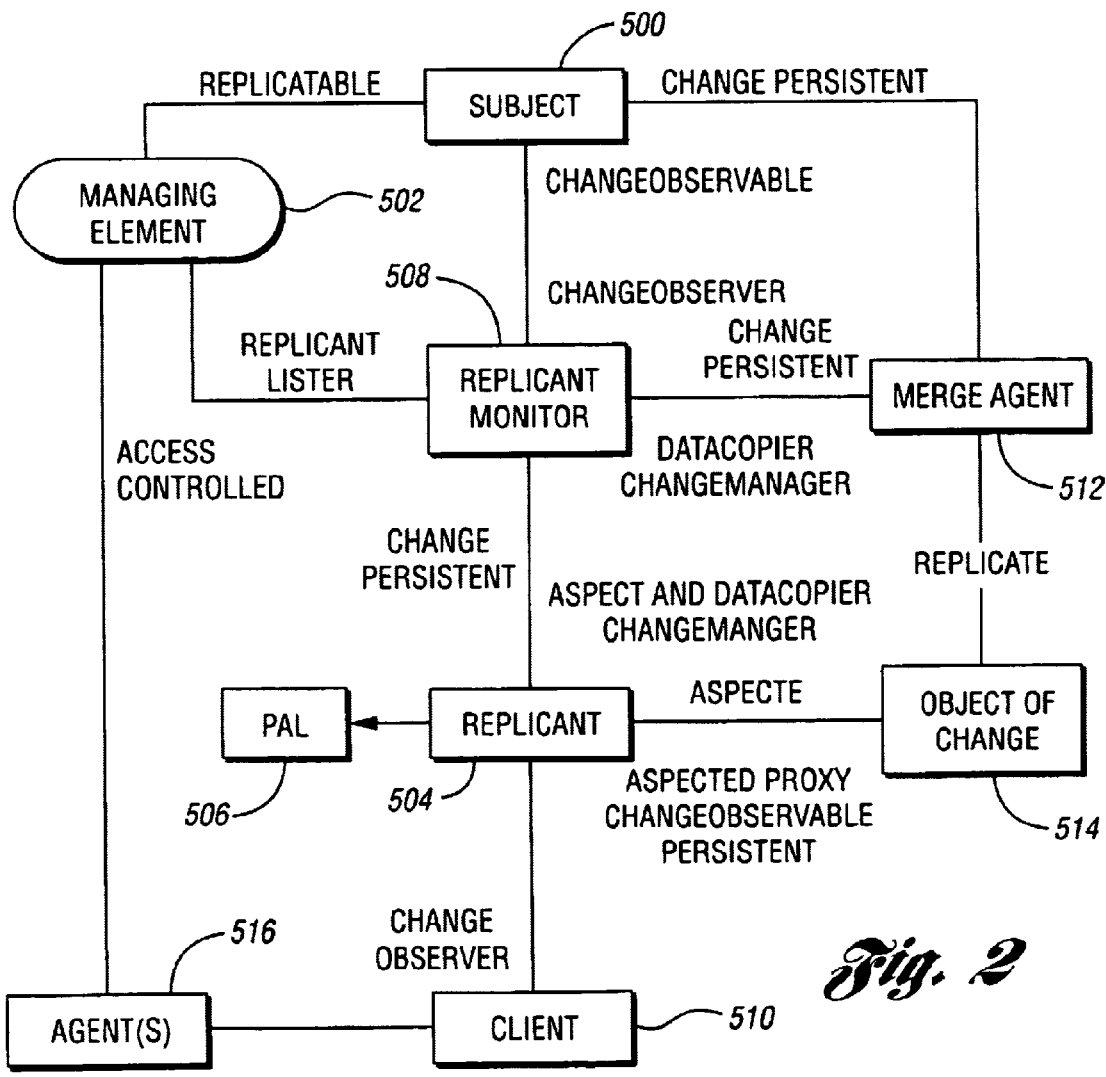
FIG. 2 is a block diagram showing the roles each element of the model plays with respect to the others.

FIG. 2 provides a high-level view of the synchronization model and the elements involved in replication and merging. A Subject is an original source element (the master or primary, trusted version). A Subject may have at most one ReplicantMonitor which monitors multiple Replicant(s) (replicate versions of the Subject). The ReplicantMonitor collects changes made to the Replicant(s) and propagates certain events to them. Each ReplicantMonitor is associated with exactly one MergeAgent (defined in the merge model) that has access to the Subject, to its ReplicantMonitor, and to each replicate version. Each Replicant has access to its ReplicantMonitor and in turn is accessed by a Client that acts on behalf of an Agent, which may be a human, an organization, or a software system that is associated with specific access control lists and access permissions. The synchronization mechanisms provide services to some unspecified managing element who can, on behalf of an Agent, give a Client a Replicant of a Subject.

FIG. 2 also illustrates the overall roles each element of the model plays with respect to the others. For each role, the synchronization model or change model defines a type that defines the services an element in that role provides. The following describe the types that specify these elements and their roles.

An abstract type Subject 500 defines an original source object. A Subject is either the master or the primary, trusted version of an Aspected element, for example, of a business object that will be replicated in order to participate in multiple business processes simultaneously or to be accessed simultaneously by multiple external agents 516. To a managing element 502, a Subject is Replicatable.

The interface type Replicant 504 defines the interface for generating a Replicant of a master or primary, trusted version. A replication operation, which takes as an argument a property access list (PAL) 506, assigns to the Replicant a reference to the original Subject, a Version, and a ReplicantMonitor 508, which is returned.

The abstract type ReplicantMonitor 508 defines an element that monitors multiple Replicant(s) collects changes made to the them and propagating certain events to them. A Subject and its ReplicantMonitor view each other as ChangeObserver and ChangeObservable, respectively. This allows the ReplicantMonitor to be apprised of any changes made to the Subject, from whatever source, which it can then propagate to its Replicant(s), so that all Client(s) 510 get a consistent view of the Subject.

To managing element 502, a ReplicantMonitor is a ReplicantLister, which maintains a list of the Replicant(s) it monitors. The managing element may use this information for any number of application-specific reasons, for example, to find out whether a particular object is being shared, who the clients of a shared object are, and so forth. The ReplicantLister role is assigned to the ReplicantMonitor rather than to the Subject in order to avoid making the Subject, which may otherwise have no more behavior than that of a data object, more complex. If necessary, the managing element can establish its own association from Subject(s) to their Replicant(s) or to their ReplicantMonitor(s), using the information provided through the interfaces Replicatable and ReplicantLister as shown in FIG. 2.

To a MergeAgent 512, a ReplicantMonitor is both a ChangeManager and a DataCopier, and so is each Replicant to its ReplicantMonitor. To a Replicant, its ReplicantMonitor is ChangePersistent, and to a ReplicantMonitor, its MergeAgent is ChangePersistent. In these two cases, ChangePersistent corresponds to the role of a mechanism that is responsible for maintaining consistency between active copies, Replicant(s), and their persistent representations, Subject(s). The Replicant expresses intentions to commit, rollback, or update, and the ReplicantMonitor passes these intentions on to the MergeAgent, who determines what actions to take with respect to these intentions.

To a MergeAgent, a Subject is ChangePersistent. In contrast to the two cases discussed above, ChangePersistent corresponds to the role of an active element that has a persistent representation. The MergeAgent is directing traditional low-level (database-level) synchronizations to commit, rollback or update. A MergeAgent directs these actions after merging changes as described in the merge model.

A Replicant represents a specific Version of a specific Subject. The abstract type Replicant defines the functionality of replicated objects from the perspective of the synchronization model and independent of the replication model. It defines operations for accessing Version information and a reference to the original Subject, and for refresh/update. As mentioned earlier, to a ReplicantMonitor, a Replicant is a DataCopier and a ChangeManager. It is also Aspected. To a Replicant, a Client is a ChangeObserver, while to a Client, a Replicant is a Persistent, ChangeObservable, AspectedProxy. A Replicant provides replication transparency, i.e., a Client can not determine how many copies of a resource (a Subject) exist. A Replicant contains an Aspected element which maintains the replicated and possibly changed data. Note in FIG. 2, no specific type is assigned to this Aspected element, which allows for a broad range of implementation choices.

An Abstract type Client defines a software element that uses a Replicant version of some original source element. A Client acts on behalf of an Agent, which may be a human, an organization, or a software system. Agents are associated with access permissions and access control lists. Clients perform operations that respond to notifications of rejected changes and unresolved change conflicts.

An AspectedProxy interface type defines the protocol for a protection proxy that controls access to an Aspected element. In general, a protection proxy has the following responsibilities: (1) providing an interface identical to that of the original subject; (2) checking access permissions for each request a Client makes; and (3) giving information about access to the subject.

In the synchronization model, the first responsibility is satisfied because both Subject and AspectedProxy share the interface Aspected. The second responsibility can be satisfied because every Replicant contains a PAL. The third responsibility is satisfied as follows. First, the observable aspects of the subject are obtained. Observable means that information about the aspect (more precisely, about the holder associated with the aspect) can be retrieved. Second, the reachable aspects of the subject are obtained. Reachable means that the aspect (more precisely, the holder associated with the aspect) can be modified. Third, the invocable aspects of the subject are obtained. Invocable are those aspects that correspond to operations. Finally, determine whether a specified aspect of the subject is observable, reachable, or invocable.

The interface type Persistent defines operations for expressing intentions to commit or rollback all changes made since the last commit or rollback.

Now a description will be provided for a normal sequence of occurrences involving the elements of the synchronization model. In general, the scenario begins with Client interactions, then moves to the propagation of consistent views, and concludes with externally-initiated changes.

More specifically, a Client interacts with what it sees as a local copy or replicate of an original source document. The Client interacts with this "local copy" from three different perspectives, each reflecting a role that the "local copy" fills. A Client can invoke operations on an AspectedProxy, register with a ChangeObservable for notification of certain changes that might occur, or express to a Persistent object an intention to commit or rollback any changes the Client has initiated.

If a Client requests a rollback, the synchronization policy in effect at the time will dictate precisely what happens. Here, we present one possible scenario: The Replicant forwards the request to its ChangePersistent service (the ReplicantMonitor), which in turn forwards the request to its ChangePersistent service (the MergeAgent). The MergeAgent applies the synchronization policy in effect to collect the (update/refresh) information needed to perform the rollback. For instance, the synchronization policy might dictate that this information reflect the original state of the Replicant unless it differs from the current state of the Subject, which takes precedence. The MergeAgent provides the needed update/refresh information to its DataCopier (ReplicantMonitor), and the ReplicantMonitor passes the information on to the appropriate DataCopier (the Replicant of this scenario). The Replicant performs the refresh/update and forwards change notifications to any ChangeObserver(s), including the Client, who may have registered an interest in the kinds of changes that occurred.

In contrast to a Client request for a rollback, a Client request to commit involves considerably more activity because the changes the Client wants to commit are, depending on the synchronization policy in effect, merged with changes made by other Client(s). For example, as with a rollback request, the commit request is forwarded from the Replicant to the Replicant Monitor, to the MergeAgent. The MergeAgent, in the course of applying the synchronization policy in effect, asks the appropriate ChangeManager (the ReplicantMonitor that forwarded the commit request) to report all changes that have been made since the last merge operation. The ReplicantMonitor reports these changes which it either has already collected or immediately collects from its ChangeManager(s) (its Replicant(s)). Again, the behavior of the ReplicantMonitor depends on the synchronization policies in effect at the time. The MergeAgent accepts and merges certain changes and forwards these merged changes to the affected ChangePersistent object, i.e., to the Subject that is associated with the ReplicantMonitor.

The synchronization model of the present invention is arranged to support multiple ways of using changes to provide Client(s) with a consistent view of an element that has been the subject of merged change operations. These ways of using changes can be applied individually or in combination. One way is to propagate an enumeration of rejected Change(s) and ChangeSet(s). This information goes from the MergeAgent to each affected ReplicantMonitor, and from each ReplicantMonitor to the affected Replicant(s), which then revert to the appropriate previous state and notify their Client of these rejected changes. A second way, is to propagate accepted changes from the affected Subject(s) to their ReplicantMonitor(s), which then invoke the changes on the affected AspectedReplicant(s). These first two ways of providing Client(s) with a consistent view of an element are appropriate when the number of changes accepted or rejected is relatively small compared to the state of the element in question. When the number of changes is large, then efficiency is improved by performing a complete refresh or partial update of the affected Replicant(s) using the chain of DataCopier interfaces from the MergeAgent to the ReplicantMonitor(s) to the Replicant(s). Unresolved change conflicts can be propagated from the MergeAgent to the ReplicantMonitor(s), to the Replicant(s), and to the Client(s) for ultimate resolution, possibly via their Agent(s).

Externally-initiated changes, e.g., a situation in which a modification to a Subject element is initiated from outside the scope of the synchronization model, must also be accounted. From the perspective of elements operating within the synchronization model, the effect would be the same as if the MergeAgent had modified the Subject. The Subject would propagate changes to its ReplicantMonitor, which would refresh or update (DataCopier) or modify (Aspected) its Replicant(s), which would notify their Client(s).

Some editions (copies, replicates) of objects are read-only, i.e., declared immutable. For these editions, we avoid the overhead of recording direct changes while retaining the ability to record indirect changes made to related objects and to observe refreshes and updates based on changes to the originals.

For refresh and update, there are three cases to consider:
(1) distribution of original Subject(s);
(2) distribution of read-only versions; and
(3) distribution of read/write versions.

Consider refresh/update of cases (2) and (3). The synchronization model can be implemented so that refresh/update policies govern the behavior of refresh/update mechanisms and allow for client-initiated refresh or update. Clients might want to ensure that they have the most recent data, notwithstanding that they could also be observers of any changes made to the originals.

Figure 7:
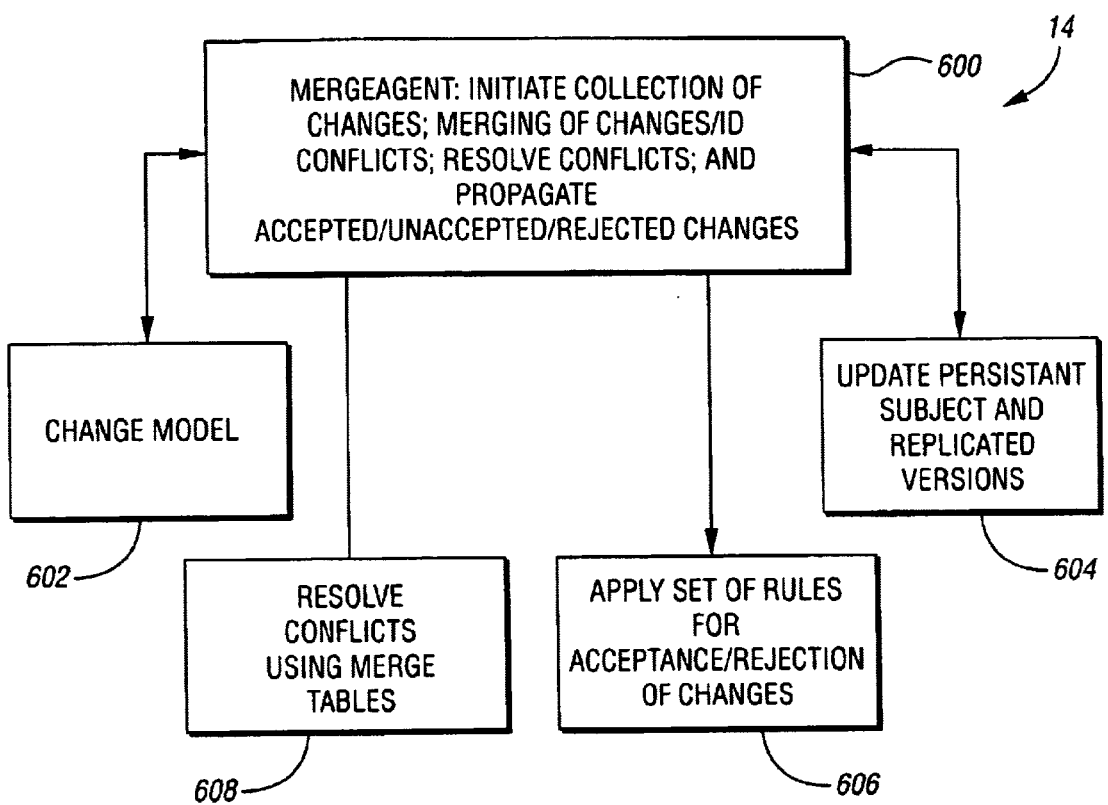
FIG. 7 is a block diagram showing the constructs of the merge submodel.

Merge model 14 is shown in greater detail in FIG. 7. With respect to the merge model, as previously discussed, whenever merging (automated conflict detection and resolution) is necessary, the synchronization model invokes the functionality of the merge model. This may or may not involve replication. If replication is involved, the merge model uses the representations defined in the replication model. Otherwise, the merge model uses only the representations defined in the change model. The merge model is arranged to define mechanisms for initiating the collection of changes, for merging changes and identifying conflicts, for resolving conflicts if possible, and for propagating accepted and rejected changes and unresolved change conflicts. In order to provide powerful, efficient coordination from both the system (software) and the agent (collaborator) perspectives, all the mechanisms are intended to be automated and to use intelligence whenever possible. This is especially true for mechanisms that merge changes and process conflicts, which is why they are encapsulated within a distinct merge model.

In accordance with the present invention, the merge model leverages on the similarities between data warehouse systems and collaborative systems. One example is the similarity between data warehouse operational data (from internal and external sources) and (possibly distributed) replicate data in collaborative systems. Another is the similarity between a data manager in a data warehouse and a merge agent in a collaborative system. In the merge model of the present invention, the MergeAgent is given the intelligence and policy-driven behavior of data managers.

As denoted at block 600, the MergeAgent in the merge model determines what changes ultimately are committed and to what state a Replicant is rolled back. It decides whether to accept or reject a Change or ChangeSet. It initiates the collection of changes, invokes the mechanisms for merging changes, identifying and resolving conflicts if possible, and propagating accepted and rejected changes and unresolved change conflicts.

While the information flows for collecting changes and for propagating accepted and rejected changes and unresolved change conflicts have been described above, the following description focuses on representation, control, and the mechanisms for merging changes and identifying and resolving conflicts in accordance with the present invention.

Regarding representation, like the synchronization model, the merge model uses the representations defined in the change model as shown in block 602. Thus, it too permits fine-grained synchronization of work results within arbitrarily complex structures. However, unlike the synchronization model, the merge model is concerned with how replicate versions are represented. As shown at block 514 in FIG. 2, each MergeAgent views the "object" of a Change as a Replicate. Thus, when processing changes (Change or ChangeSet), the MergeAgent has access to necessary operations, as defined by type Replicate.

With respect to control, the MergeAgent acts much like a data manager in a data warehouse system. For example, as defined by Orfali et al. in *The Essential Client/Server Survival Guide*, Second ed., New York: John Wiley & Sons, 1996, a data warehouse is an intelligent data store that manages and aggregates information from multiple sources, distributes it, and activates business policies. The Warehouse Manager extracts operational data from internal and external sources and integrates the data into the target system. It also creates and manages meta-data, i.e., data about the data in the target system. This meta-data is in the form of an object-oriented data model that can be queried.

In the merge model, a MergeAgent initiates the collection of changes, merges them, and asynchronously updates both the persistent Subject(s) and the replicated versions at block 604, which involves propagating accepted and rejected changes, unresolved change conflicts, and data updates or refreshes. Collecting and merging changes corresponds to aggregating data, propagating change information and update or refresh data corresponds to distributing aggregated information. The merge model performs these functions in accordance with policies that can be defined at the mechanism level and the problem domain level. The policies can direct MergeAgent(s) to collect changes at some particular frequency or when specific conditions are satisfied or events occur. The types and type definitions that define the submodels of the collaboration model along with developer-defined types and type definitions correspond to the meta-data of a data warehouse.

As noted above, in order to provide powerful, efficient coordination from both the system (software) and the agent (collaborator) perspectives, the mechanisms for merging changes and identifying and resolving conflicts are intended to be automated and to use intelligence whenever possible. In order to facilitate development, the mechanisms are intended to allow developers to express conditions for merging declaratively as problem domain concepts rather than procedurally as executable routines.

In general, MergeAgents apply rules at block 606 to determine which changes are accepted and which are rejected, and what to do when changes are not received in the chronological order in which they were made. A MergeAgent decides how sets of changes are used to provide users with a consistent view of an element. It defines the synchronization to be performed, e.g., not to replicate deletions from certain Agent(s), and it resolves conflicts, e.g., choose one set of changes as primary, and create rejection responses for all the other sets of changes. A change set can be marked as a transaction. If one change in the set is nullified during conflict resolution, then the entire change set (i.e., transaction) is nullified and the user is notified. One way for merge agents to resolve conflicts is to use merge tables as denoted at block 608. A merge table is a declarative representation that identifies the merge actions to be taken as a function of conflicting operations taken by different users. Suitable recursive merge (conflict resolution) algorithms can be used to stop recursing when they reach an immutable Replicated construct.

Figure 8:
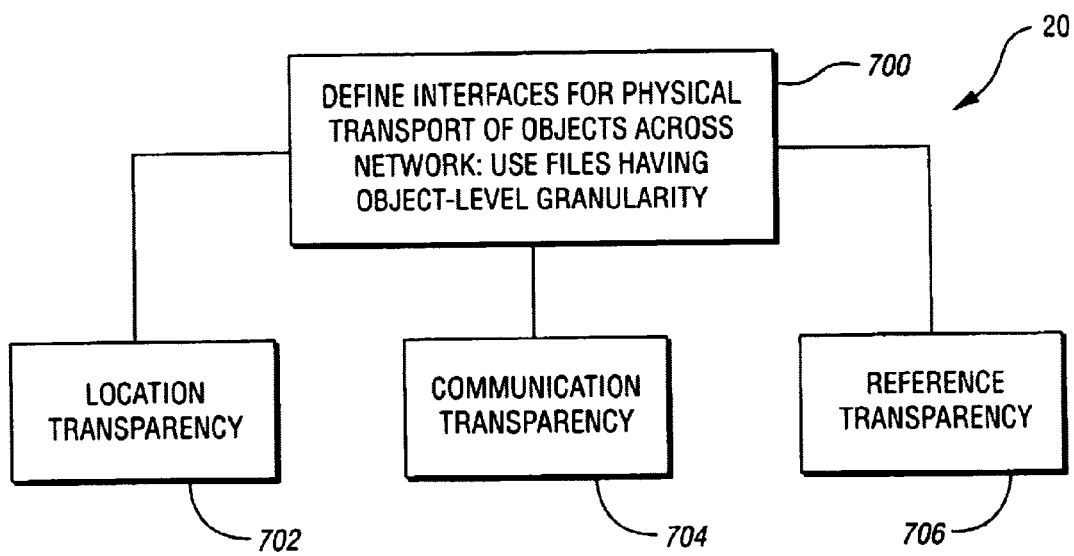
FIG. 8 is a block diagram showing the constructs of the distribution submodel.

Distribution model 20 of the present invention is shown in greater detail in FIG. 8, and is arranged to define how (possibly multiple versions of) objects are physically transported across a network as denoted at block 700. It defines the distribution mechanisms to support the flexible communication patterns necessary for efficient collaboration from the perspective of distributed systems performance. It provides location transparency 702, communication transparency 704, and reference transparency 706.

Location transparency 702 means that agents and high-level system software elements are unaware of the physical location of shared objects, e.g., on central servers or distributed across clients. It can be done in a way that allows programming to be made easier because developers can write code without concerns about whether the object location is local or remote, while supporting a range of deployment strategies such as so-called fat, slender, or thin clients. In addition, systems can relocate shared objects anywhere, anytime, such as to perform load balancing.

In addition to providing the benefits of location transparency, the distribution model of the present invention is arranged to define how objects are physically transported across networks in a way that supports multiple transport implementation techniques, allows improved efficiency when shared objects are maintained locally, on a central server, rather than distributed across a network, and provides more efficient distribution of objects that are related to other objects.

More specifically, the distribution model defines physical transport of objects across a network to be accomplished by using files with object-level granularity, that is, each file can hold multiple objects. Files with object-level granularity are more useful and less cumbersome than files with file-level granularity, in which each file can hold at most one object. For example, with file-level granularity, each file and the object it contains must be independent of all other files and of the objects they contain. In contrast, object-level granularity offers the possibility that objects may be mutually dependent, that is, may reference each other. While this possibility offers the most power, its implementation must be done carefully, or inefficiencies will result.

Thus, the distribution model does not specify the mechanisms for packing and unpacking distributed objects, only their interfaces. Perhaps the most primitive choice, in terms of programmer support, is ASCII files. At the other extreme, Java's Object Serialization mechanism is built into the language and supports object-level files with mutually dependent objects. However, the serialization mechanism results in inefficiencies.

Communication transparency 704 refers to the aspect of location transparency that involves hiding whether units of communication are delivered locally or across a network, and within or across processes. For modern distributed systems with interactive component objects, such as business objects, the data carried by messages between objects must be in some type-independent data stream that also carries meta-data. A variety of implementation mechanisms can satisfy this requirement. Choices include traditional mechanisms such as sockets, remote procedure calls (RPC), and messaging (based on queues). A modern mechanism is the remote method invocation (RMI) of Java, which is layered on Java's Object Serialization. RMI marshals parameters to remote methods into a form that can be transported across a network and unmarshaled in a virtual machine of the remote server.

The distribution model of the present invention does not specify the implementation mechanisms for communication across a network. The distribution model defines a set of interfaces that hide the choice of mechanism from the application developer. This set of interfaces handles dispatch and delivery of units of communication locally (on the same machine) or across a network, intra- or inter-process, and provides access transparency, which is transparent redirection of interprocess interactions from a local process to a remote process.

Figure 9:
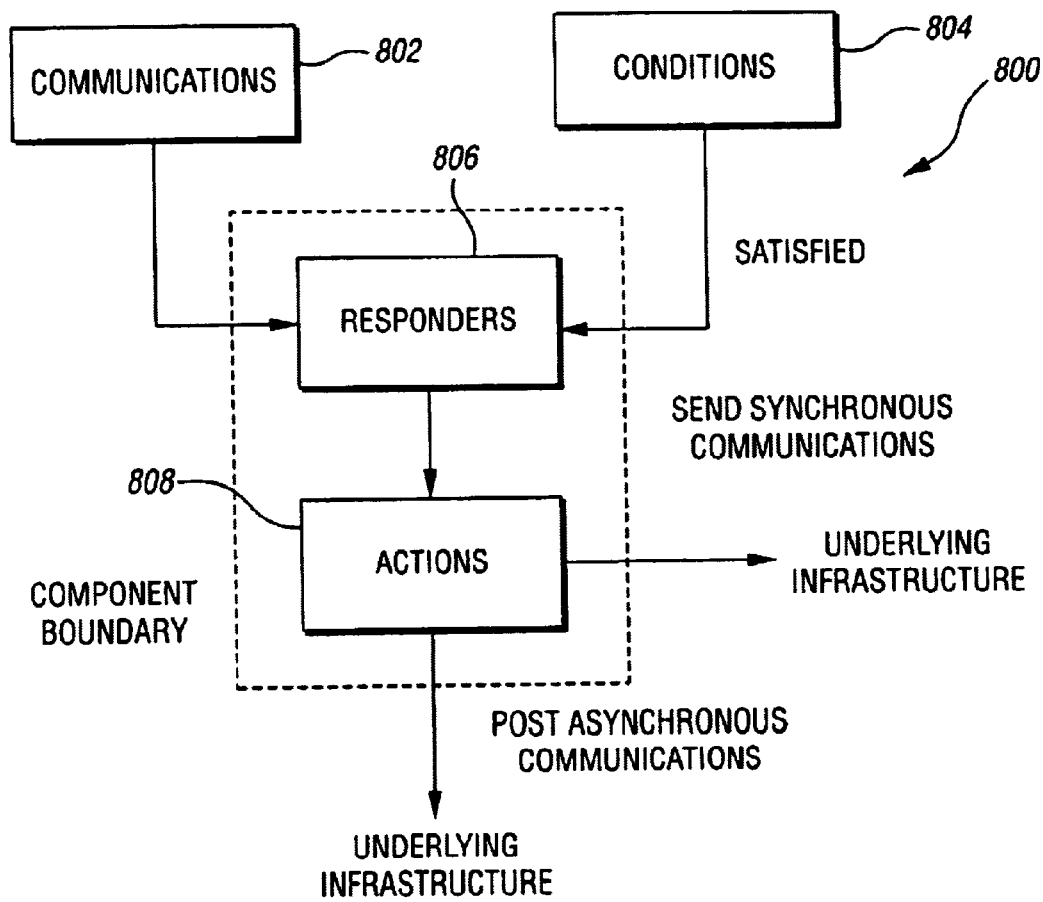
FIG. 9 is a block diagram showing a communications architecture in accordance with the present invention.

FIG. 9 shows a communication architecture 800 defined by these interfaces. In a system, communications 802 (messages, events, signals) are directed, distributed or broadcast, and conditions 804 are satisfied. Responders 806 receive or detect communications and conditions. Responders invoke appropriate actions 808, which can bidirectionally communicate. Actions can send synchronous communications, and wait for their return, or actions can post asynchronous communications and continue without wait. Although authors of actions do prescribe whether communications are sent or posted, they are free from concern about the location of the recipients. An underlying communications infrastructure is responsible for handling the dispatch and delivery of communications locally or across a network and inter- or intra-process. The communication architecture of the present invention allows a range of control models which can support sophisticated collaborations involving the maintenance of state information over many interactions due to compatibility with the other sub-models of the collaboration model. For example, the elements of the synchronization model shown in FIG. 2 would be implemented using the elements of the distribution model in FIG. 9. This would support collaborative systems in which merge agents, replicant monitors, and replicants could be distributed or located on a central server.

In addition to supporting location transparency, communication transparency also advantageously provides improved efficiency when shared objects are maintained locally, on a central server, rather than distributed across a network. With communication transparency, the overhead costs of distributed object functionality, i.e., that portion of an infrastructure tasked with delivering communications across a network, is incurred only when a system is deployed with distributed shared objects, and not when shared objects are maintained on a central server, such as in thin/slender client strategies.

Reference transparency 706 refers to the aspect of location transparency that concerns referencing an object in a way that is independent of whether the object resides locally or somewhere across a network. For example, in Java's Object Serialization mechanism, when Java serializes a given set of objects (i.e., places them in a file for transport across a network), it includes in that file any other objects that the given objects reference, any objects referenced by those objects, and so forth. In Java, the methods that serialize a specified object recursively traverse references to other objects to create a complete serialized representation of the object graph originating with the specified object. This recursive serialization of objects can result in a serialization file that is quite large, takes a long time to transport, and may contain information that is not relevant for the system that will be receiving it. Thus, with Java Object Serialization, the burden is on the developer to design programs in a way that does not allow serialization to negatively impact efficiency.

The distribution model of the present invention supports referencing objects in a way that allows object-level granularity with mutually-dependent objects, while avoiding it inefficiencies, and without burdening developers. In the distribution model, object references are programming-language independent. In the same way that an underlying infrastructure determines whether communications are delivered locally or across a network, here, an underlying infrastructure determines whether references are manifested as pointers to objects or as string identifiers that uniquely identify objects within some predefined name space. The underlying infrastructure would contain policies and mechanisms to support this language-independent referencing. Policies would determine when references would be manifested as pointers and when they would be manifested as string identifiers.

Naming and directory services would support the use of string identifiers to uniquely identify objects. Mechanisms for a so called "lazy transport" would provide local access to objects initially referenced by string identifier. Lazy transport is the technique of transporting an object only when local access to it is first requested. It is analogous to the programming technique of lazy initialization, i.e., creating a resource only when it is first accessed.

Like the interfaces that provide communications transparency, the interfaces that provide reference transparency isolate the developer and the runtime code from the underlying architecture. These interfaces define naming and directory services that support configurable local and global name spaces, which can be used to divide and subdivide a distributed environment. Each name space is administered by a higher-order naming authority, may have dimensions, and may have a mechanism for generating identifiers. An identifier is either a local identifier, meaningful within a specific name space, or a global identifier, meaningful across multiple name spaces. A naming authority can define its name spaces based on a variety of naming conventions, such as for a combination of clients and servers, or for a possibly multi-session dialogue with a client. All but the top-most naming authority exists within a higher-order name space and has a local identifier within that name space. An identifier generator has a sequencer, which it uses to generate local identifiers within the scope of a higher-order name space. This is used as the basis for generating global identifiers. Dimensions are recursively composed structures in which each leaf is a string-valued dimension.

Reference transparency, in addition to supporting location transparency, provides more efficient transport of objects that are related to other objects. Consider the inefficiencies associated with network transport using files with object-level granularity and mutually dependent objects. With reference transparency, if Java Object Serialization were used, the Java serialization methods would include a related object only when its reference is manifested by a pointer and not by an identifier, which would be included but would terminate the recursive packaging of objects.

Policies would determine when to package an object related to a transported object as an object (i.e., use a pointer reference) and when to package only an identifier (i.e., use an identifier reference). Policies could be based on whether the related object is necessary to the proper functioning of the transported object, the receiver of the transported object is likely to be interested in the related object, the kind of communication links (e.g., wired versus wireless), and on the nature of the application (e.g., whether communication lag is less or more important than response time while the objects are being accessed by the user). Identifiers would be used to reference objects related to transported objects but initially considered to be of little or no interest to the system receiving the transported objects. These objects are sometimes called ghost objects.

Reference transparency is invaluable also for mitigating other sources of overhead incurred when object systems are distributed. For example, in many object systems, objects register their interest in certain events in a central interest registry. For distributed object systems, this solution is inefficient because objects may be remote from each other and a central registry increases network traffic. With reference transparency, combined with communication transparency, objects can register directly with each other, regardless of location, which may change over time.

Reference transparency is also synergistic with the notion of units of communication as data streams with meta-data. Instead of passing method arguments by value or by reference, as in traditional programming languages, distributed object arguments are passed by object "reference." Other kinds of system mechanisms can benefit. For example, mechanisms that activate objects from persistent stores can be designed independent of the physical location of the persistent objects, which can be relocated anywhere, anytime such as for load balancing (redirection maps can show current physical locations of objects with logical global names).

While the best mode for carrying out the invention has been described in detail, those familiar with the art to which this invention relates will recognize various alternative designs and embodiments for practicing the invention as defined by the following claims can be made without departing from the spirit and scope of the invention.

What is claimed is:

1. A collaboration model for supporting construction of distributed systems and a range of collaborative situations comprises:

a type submodel for defining constructs;

a change submodel responsive only to type submodel constructs and arranged to support evolvability by defining a manner in which types and instances are allowed to change;

a programming language independent replication submodel arranged to define a manner in which multiple versions of objects are represented;

a synchronization submodel arranged to collect and report changes in the replication submodel and to optimize software reuse in isolation of potential changes;

a merge submodel arranged to initiate collection of changes, identify conflicts, resolve conflicts, and propagate notification of whether changes were accepted, rejected, or a conflict could not be resolved; and a distribution submodel arranged to define a manner in which objects are physically transported across a system.

2. The collaboration model of claim 1 wherein the type model is arranged to provide a representational foundation for the collaboration model that isolates the collaboration model from any external programming system.

3. The collaboration model of claim 2 wherein the type model provides isolation by defining types as well as types of types.

4. The collaboration model of claim 2 wherein the type model is arranged to provide fine-grained representations by defining constructs that are finer-grained than constructs accessible at a programming level interface of a high level programming language.

5. The collaboration model of claim 2 wherein the type model is arranged to support arbitrarily complex software structures.

6. The collaboration model of claim 2 wherein the type model comprises an elementary construct having a type property containing at least a unique identifier construct for each property and a value construct.

7. The collaboration model of claim 6 wherein the value construct can define a data type or a particular operation.

8. The collaboration model of claim 1 wherein the type model comprises modeling constructs formed from an attribute construct for defining a value associated with an element, and a relationship construct for defining a connection involving types.

9. The collaboration model of claim 1 wherein the change submodel is arranged to use constructs of only the type model, thereby gaining benefits associated with the type model while avoiding additional overhead.

10. The collaboration model of claim 1 wherein the change submodel is arranged to provide change detection and notification.

11. The collaboration model of claim 10 wherein the change submodel comprises a set of types for defining a protocol that allows an element to register an interest in changes and receive notification of a change.

12. The collaboration model of claim 11 wherein the set of types comprises a ChangeObserver and a ChangeObservable, wherein the ChangeObserver can selectively register for a change detected by the ChangeObservable.

13. The collaboration model of claim 10 wherein the change submodel is arranged to provide selective notification.

14. The collaboration model of claim 1 wherein the change submodel is arranged to a define changes as a function of an operation that produces the change, including operations that are not initially defined.

15. The collaboration model of claim 1 wherein the change submodel is arranged to define constructs that record and distinguish between direct and indirect changes.

16. The collaboration model of claim 1 wherein the replication submodel comprises a type replicate and a set of types defined in the type submodel and change submodel.

17. The collaboration model of claim 15 wherein the set of types comprises Aspect, Holder, Property, Attribute, and Relationship defined by the type model, and Change, ChangeSet, ChangeObserver, and ChangeObservable defined by the replication submodel.

18. The collaboration model of claim 1 wherein the replication submodel comprises no distribution functionality.

19. A collaboration model for supporting construction of distributed systems and a range of collaborative situations comprising:
   a type submodel for defining constructs;
   a change submodel responsive only to type submodel constructs and arranged to support evolvability by defining a manner in which types and instances are allowed to change;
   a programming language independent replication submodel arranged to define a manner in which multiple versions of objects are represented;
   a synchronization submodel arranged to collect and report changes in the replication submodel and to optimize software reuse in situations involving (1) changes but no automatic conflict detection and resolution, (2) changes with automatic conflict detection and resolution, and (3) replication;
   a merge submodel arranged to initiate collection of changes, identify conflicts, resolve conflicts, and propagate notification of whether changes were accepted, rejected, or a conflict could not be resolved; and
   a distribution submodel arranged to define a manner in which objects are physically transported across a system.

20. The collaboration model of claim 19 wherein the synchronization submodel is arranged to optimize software reuse by using types to define roles to distinguish responsibilities for elements in each situation.

21. A collaboration model for supporting construction of distributed systems and a range of collaborative situations comprising:
   a type submodel for defining constructs;
   a change submodel responsive only to type submodel constructs and arranged to support evolvability by defining a manner in which types and instances are allowed to change;
   a programming language independent replication submodel arranged to define a manner in which multiple versions of objects are represented;
   a synchronization submodel arranged to collect and report changes in the replication submodel, to optimize software reuse in isolation of potential changes, and to invoke the functionality of the merge when automatic conflict resolution is required;
   a merge submodel arranged to initiate collection of changes, identify conflicts, resolve conflicts, and propagate notification of whether changes were accepted, rejected, or a conflict could not be resolved; and
   a distribution submodel arranged to define a manner in which objects are physically transported across a system.

22. The collaboration model of claim 21 wherein the merge submodel is arranged to use representations defined by the replication submodel if replication is invoked, or only representation defined by the change submodel if replication is not invoked.

23. The collaboration model of claim 1 wherein the distribution submodel is arranged to use files having object-level granularity.

24. The collaboration model of claim 1 wherein the distribution submodel is arranged to provide communications transparency by defining a set of interfaces that handle dispatch and delivery of units of communication.

25. The collaboration model of claim 1 wherein the distribution submodel is arranged to provide reference transparency by defining a set of interfaces that comprise a set of policies and mechanisms for supporting language-independent referencing.

* * * * *